US 7,056,124 B1

(12) United States Patent
Scheuring

(10) Patent No.: US 7,056,124 B1
(45) Date of Patent: Jun. 6, 2006

(54) METHOD AND SYSTEM FOR CREATING, ADMINISTERING AND AUTOMATING SCORING OF DIMENSIONAL MODELING CONSTRUCTED RESPONSE ITEMS

(75) Inventor: Sylvia Tidwell Scheuring, Carmel, CA (US)

(73) Assignee: CTB/McGraw-Hill, Monterey, CA (US)

( * ) Notice: Subject to any disclaimer, the term of this patent is extended or adjusted under 35 U.S.C. 154(b) by 449 days.

(21) Appl. No.: 10/643,889

(22) Filed: Aug. 20, 2003

Related U.S. Application Data

(60) Provisional application No. 60/404,393, filed on Aug. 20, 2002.

(51) Int. Cl.
*G09B 3/00* (2006.01)

(52) U.S. Cl. ..................................... 434/322
(58) Field of Classification Search ................ 434/236, 434/322, 323, 327, 353, 354
See application file for complete search history.

(56) References Cited

U.S. PATENT DOCUMENTS

| 3,382,588 | A | | 5/1968 | Serrell et al. |
| 3,501,851 | A | | 3/1970 | Price, Jr. et al. |
| 3,704,337 | A | * | 11/1972 | Sims et al. ................ 434/312 |
| 3,761,877 | A | | 9/1973 | Fernald |
| 3,963,866 | A | | 6/1976 | Tanie |
| 4,360,345 | A | | 11/1982 | Hon |
| 4,475,239 | A | | 10/1984 | van Raamsdonk |
| 4,498,870 | A | * | 2/1985 | Madonna .................. 434/335 |
| 4,518,361 | A | | 5/1985 | Conway |
| 4,547,161 | A | | 10/1985 | Manning |
| 4,593,904 | A | | 6/1986 | Graves |
| 4,656,507 | A | | 4/1987 | Greaves et al. |
| 4,686,522 | A | | 8/1987 | Hernandez et al. |
| 4,813,013 | A | | 3/1989 | Dunn |
| 4,897,736 | A | | 1/1990 | Sugino |
| 4,931,018 | A | | 6/1990 | Herbst et al. |
| 4,967,322 | A | | 10/1990 | DuBois |
| 5,002,491 | A | | 3/1991 | Abrahamson et al. |
| 5,011,413 | A | | 4/1991 | Ferris et al. |
| 5,040,131 | A | | 8/1991 | Torres |
| 5,100,329 | A | | 3/1992 | Deesen et al. |
| 5,211,564 | A | | 5/1993 | Martinez et al. |
| 5,302,132 | A | * | 4/1994 | Corder ...................... 434/156 |
| 6,058,367 | A | * | 5/2000 | Sutcliffe et al. ............... 705/1 |
| 6,688,890 | B1 | * | 2/2004 | von Buegner ............. 434/322 |
| 6,767,213 | B1 | * | 7/2004 | Fleishman .................. 434/236 |

* cited by examiner

*Primary Examiner*—Kurt Fernstrom
(74) *Attorney, Agent, or Firm*—Rothwell, Figg, Ernst & Manbeck, P.C.

(57) ABSTRACT

The methodology of the present invention is implemented by a system which defines concepts about which a respondent is required to demonstrate knowledge of a relationship. The concepts are represented by respondent-manipulable devices that are uniquely associated with the concepts, and the respondent is able to manipulate attributes of the devices to create an arrangement of the devices representative of the respondent's understanding of the relationship of the concepts with which the devices are associated. The attributes of the manipulated devices are recorded and converted into a response pattern based on the cognitive relationships of the devices as manipulated by the respondent. One or more predefined rubric patterns are associated with the constructed response item and define possible cognitive patterns of the concepts as represented by the devices. The response pattern is compared to the rubric pattern to identify matches between the response pattern and the rubric pattern. Implications, or outcomes, are associated with each rubric pattern defined, and a scoring result is created based on the implications of the rubric patterns that match the response patterns.

17 Claims, 31 Drawing Sheets

| Topic |  |
|---|---|
| Phases of the Moon | |
| ID | |
| 007755 | |
| Name | |
| Phase of the Moon Calendar Model | |
| Task Question | |
| What are the relative positions of the Earth, the Sun and the Moon for the following phases of the moon: full, half waning, new, and half waxing? | |
| Task Process | |
| Choose a date on the calendar which shows one of the phases of the moon and then show relative positions of the Earth, Sun and Moon when the moon is in that phase | |
| Concept | Variable Attributes |
| Sun | (x,y,t) |
| Earth | (x,y,t) |
| Moon | (x,y,t) |

FIG. 4

| Template ID |
|---|
| 00345 |
| Name |
| 2-D Position Modeling Template |
| Description |
| A palette of 2-20 images or animations is on the left side of the screen, the student moves any number of these images to the right modeling area to create positional relationships. |

| Device Types | Variable Attributes |
|---|---|
| Image | (x,y) |
| Animation | (x,y) |

| Output description |
|---|
| The (x,y) position of each of the images by concept name |
| Output Data Format |
| ```
{
     "template" : {
          "name" : "2-D Position Modeling Template",
          "ID" : 00345
     },
     "devices" : {
          "<concept1>": {
               "position" =(x,y)
          },
          "<concept2>": {
               "position" =(x,y)
          },
          .....
          "<conceptN>": {
               "position" =(x,y)
          }
     }
}
``` |

FIG. 5

| Concept | Devices | |
|---|---|---|
| | 3-D (x,y,t) computer based template | 3-D (x,y,t) manual administration |
| Sun | Virtual Device (Image) 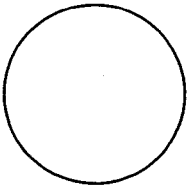 | Physical Device (Ball) Large size yellow rubber ball |
| Earth | Virtual Device (Image) 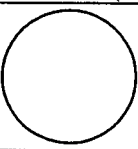 | Physical Device (Ball) Medium size blue plastic ball |
| Moon | Virtual Device (Image)  | Physical Device (Ball) Small size white ping-pong ball |
| Time | Virtual Device (Image) <br> | Su | M | Tu | W | Th | F | Sa | <br> |  |  |  |  |  | 1 | 2 | <br> | 3 | 4 | 5 | 6 | 7 | 8 | 9 | <br> | 10 | 11 | 12 | 13 | 14 | 15 | 16 | <br> | 17 | 18 | 19 | 20 | 21 | 22 | 23 | <br> | 24 | 25 | 26 | 27 | 28 | 29 | 30 | <br> | 31 |  |  |  |  |  |  | | Physical Device (Calendar) Braille/Regular calendar (depending on need) |
| Full Moon | Virtual Device (Image)  | Physical Device (Voice) "The moon when it appears to be bright and circular" |
| Half Waning Moon | Virtual Device (Image)  | Physical Device (Voice) "The moon when it appears the right side of a circle" |
| New Moon | Virtual Device (Image)  | Physical Device (Voice) "The moon when it appears to be completely dark" |
| Half Waxing Moon | Virtual Device (Image)  | Physical Device (Voice) "The moon when it appears to the left side of a circle" |

FIG. 10

| RELATIONSHIP | Formal Definition | |
|---|---|---|
| | 2-Dimensional Model (x,y) | 3-Dimensional Model (x,y) |
| <A> Above <B> | $A_{MinX} > B_{MaxX}$ | $A_{MinZ} > B_{MinZ}$ |
| <A> Below <B> | $A_{MinX} < B_{MaxX}$ | $A_{MinZ} < B_{MinZ}$ |
| <A> and <B> are on opposite sides of <C> | magnitude(AC + BC) < magnitude(AC) or magnitude(AC + BC) < magnitude(BC) (AC is defined as the vector between the center of device A and the center of device C, similarly BC is defined as the vector between the center of device B and the center of device C) | magnitude(AC + BC) < magnitude(AC) or magnitude(AC + BC) < magnitude(BC) (AC is defined as the vector between the center of device A and the center of device C, similarly BC is defined as the vector between the center of device B and the center of device C) |
| <A> and <B> are on the same sides of <C> | magnitude(AC + BC) > magnitude(AC) or magnitude(AC + BC) > magnitude(BC) (AC is defined as the vector between the center of device A and the center of device C, similarly BC is defined as the vector between the center of device B and the center of device C) | magnitude(AC + BC) > magnitude(AC) or magnitude(AC + BC) > magnitude(BC) (AC is defined as the vector between the center of device A and the center of device C, similarly BC is defined as the vector between the center of device B and the center of device C) |
| <A> Touching <B> | There is some point within the area covered by device A ($A_x$, $A_y$) such that ($A_x$+/-5 pixels, $A_y$+/- 5 pixels) is within the area covered by device B | There is some point within the volume occupied by device A ($A_x$, $A_y$, $A_z$) such that ($A_x$+/-5% of the maximum distance in x direction), $A_y$+/- 5% of the maximum distance in y direction, $A_z$+/- 5% of the maximum distance in z direction) is within the volume occupied by device B |
| <A> Inside <B> | $A_{MaxX} < B_{MaxX}$ and $A_{MinX} > B_{MinX}$ and $A_{MaxY} < B_{MaxY}$ and $A_{MinY} > B_{MinY}$ | $A_{MaxX} < B_{MaxX}$ and $A_{MinX} > B_{MinX}$ and $A_{MaxY} < B_{MaxY}$ and $A_{MinY} > B_{MinY}$ and $A_{MaxZ} < B_{MaxZ}$ and $A_{MinZ} > B_{MinZ}$ |
| <A> Bigger than <B> | The area covered by device A is greater than the area covered by Device B | The volume occupied by device A is greater than the volume occupied by device B |
| <A> Smaller than <B> | The area covered by device A is smaller than the area covered by Device B | The volume occupied by device A is smaller than the volume occupied by device B |
| <A> Taller than <B> | $A_{MaxY}-A_{MinY} > B_{MaxY}-B_{MinY}$ | $A_{MaxZ}-A_{MinZ} > B_{MaxZ}-B_{MinZ}$ |
| <A> Shorter than <B> | $A_{MaxY}-A_{MinY} < B_{MaxY}-B_{MinY}$ | $A_{MaxZ}-A_{MinZ} < B_{MaxZ}-B_{MinZ}$ |
| <A> Greater than <B> | $A_{value} > B_{value}$ | $A_{value} > B_{value}$ |
| <A> Less than <B> | $A_{value} < B_{value}$ | $A_{value} < B_{value}$ |
| <A> Darker than <B> | $A_{red}+A_{green}+A_{bue} < B_{red}+B_{green}+B_{bue}$ (where $X_{color}$ indicates the RGB values for the color) | $A_{red}+A_{green}+A_{bue} < B_{red}+B_{green}+B_{bue}$ (where $X_{color}$ indicates the RGB values for the color) |
| <A> Lighter than <B> | $A_{red}+A_{green}+A_{bue} > B_{red}+B_{green}+B_{bue}$ (where $X_{color}$ indicates the RGB values for the color) | $A_{red}+A_{green}+A_{bue} > B_{red}+B_{green}+B_{bue}$ (where $X_{color}$ indicates the RGB values for the color) |
| <A> Same color as <B> | $A_{red} = B_{red}$ and $A_{green} = B_{green}$ and $A_{blue}=B_{blue}$ | $A_{red} = B_{red}$ and $A_{green}=B_{green}$ Aand $A_{blue}=B_{blue}$ |
| <A> Same size as <B> | $A_{MaxY}-A_{MinY} = B_{MaxY}-B_{MinY}$ +/- 5% of $B_{MaxY}-B_{MinY}$) and $A_{MaxX}-A_{MinX} = B_{MaxX}-B_{MinX}$ +/- 5% of $B_{MaxX}-B_{MinX}$) | $A_{MaxY}-A_{MinY} = B_{MaxY}-B_{MinY}$ +/- 5% of $B_{MaxY}-B_{MinY}$) and $A_{MaxX}-A_{MinX} = B_{MaxX}-B_{MinX}$ +/- 5% of $B_{MaxX}-B_{MinX}$) and $A_{MaxZ}-A_{MinZ} = B_{MaxZ}-B_{MinZ}$ +/- 5% of $B_{MaxZ}-B_{MinZ}$) |
| <A> Same length as <B> | The longest dimension of A is greater than the longest dimension of B | The longest dimension of A is greater than the longest dimension of B |
| <A> Same intensity as <B> | For the HSB values of the devices, the Brightness of A is greater than the brightness of B | For the HSB values of the devices, the Brightness of A is greater than the brightness of B |

FIG. 13

| Pattern | Sub Patterns | Implication Type | Implication Value |
|---|---|---|---|
| "Night" | "Person" and "Sun" on the opposite sides of "Earth" | "score" | 3 |
| | | "reward" | (image="goldstar.jpg", sound="hurray.au") |
| | | "correct" | 1 |
| | | "knowledge" | {("sun is on the opposite side of earth at night", 0.95), ("sunlight makes daylight", 0.99)} |
| | | "navigation" | ItemID=88921 |
| "Moon makes Night" | "Person" and "Moon" on the same side of "Earth" | "score" | 0 |
| | "Sun" not used | "reward" | (sound="goodtry.au") |
| | | "correct" | 0 |
| | | "knowledge" | {("sun is on the opposite side of earth at night", -0.95)} |
| | | "navigation" | ItemID=12346 |
| "Sun goes into Flat Earth" | "Flat Earth" used | "score" | 1 |
| | "Sun" inside "Flat Earth" | "reward" | (sound="oops.au") |
| | | "correct" | 0 |
| | | "knowledge" | {("sun is on the other side of earth at night", -.99),("the earth is shaped like a ball", -0.50 |
| | | "navigation" | ItemID=07685 |

FIG. 15

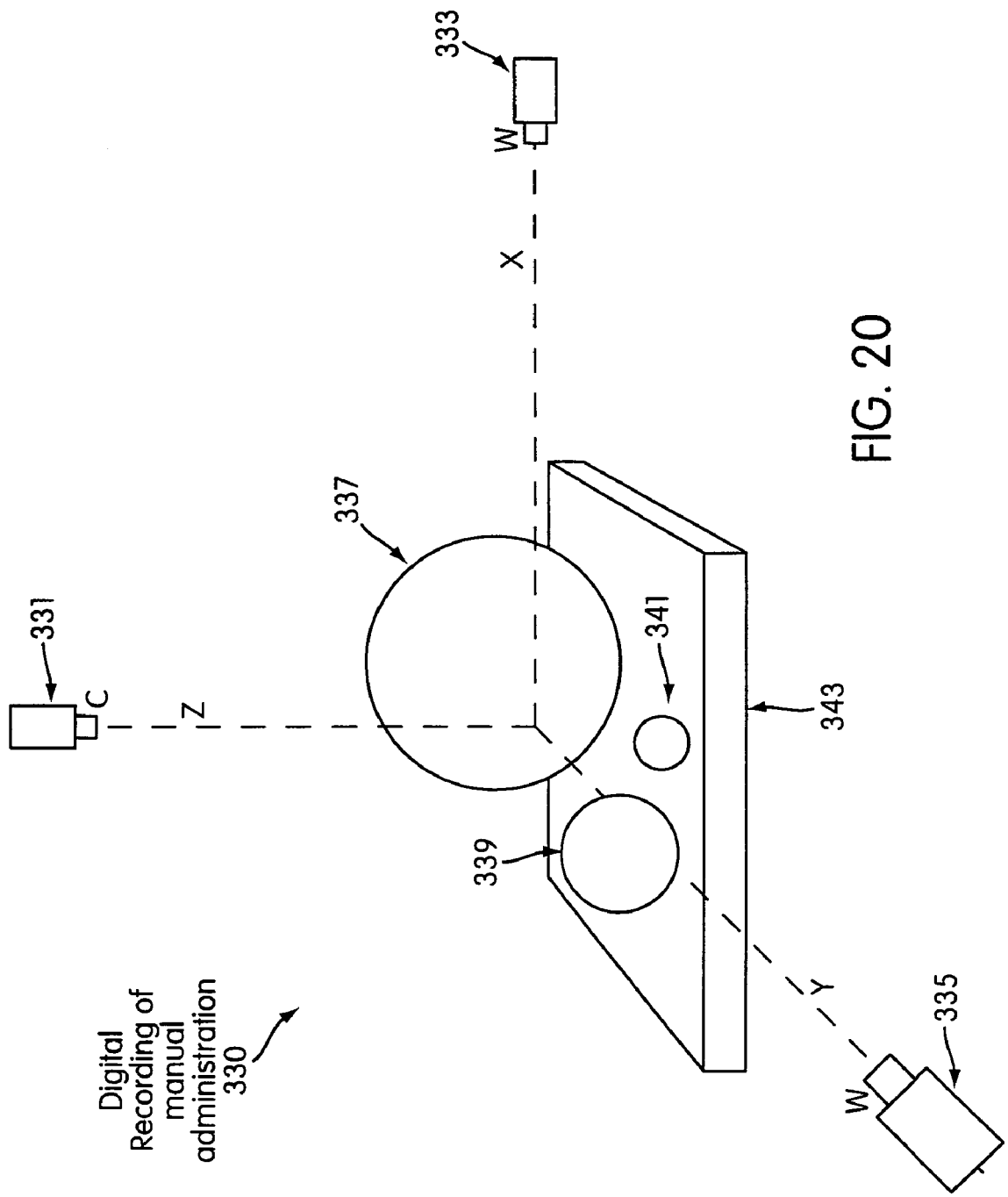

```
{
    "template" = {
        "name" : "2-D Position Modeling Template",
        "ID" : 00345
    },
    "item" = {
        "name" : "Phase of the Moon Calendar Model",
        "ID" : 007755
    },
    "devices" = {
        "Sun": {
            [(30,100,7),(30,100,14),(30,100,21),(30,100,28)]
        },
        "Earth" : {
            [(71,203,7),(71,203,14),(71,203,21),(71,210,28)]
        },
        "Moon" : {
            [(93,132,7),(170,58,14),(120,274,21),(93,254,28)]
        }
    }
}
```

FIG. 25

METHOD AND SYSTEM FOR CREATING, ADMINISTERING AND AUTOMATING SCORING OF DIMENSIONAL MODELING CONSTRUCTED RESPONSE ITEMS

This application claims the benefit of U.S. Provisional Application Ser. No. 60/404,393 filed Aug. 20, 2002, the contents of which are hereby incorporated by reference.

BACKGROUND

1. Field of the Invention

The present invention provides systems and methods that make teaching and assessment of students' understanding of relationships between concepts and facts more interesting to students and teachers and also decreases the costs and elapsed time associated with creation, administration, and scoring of constructed responses for students.

2. Discussion of Related Art

Multiple choice type response items (i.e., questions) completely bind student responses to the question to the answer choices presented. This type of item must be constructed very carefully to avoid the problem of "smart test takers" guessing the answer to the problem based on the construction of the distracters (i.e., possible incorrect responses) versus the correct response. The binding of the item provides additional information about the intent of the question when the student evaluates the complete set of possible choices. This means that the time required for ensuring that the stimulus (i.e., a passage or graphic display about which questions are asked) was completely understood is reduced. Any misunderstands that are possible from the stimulus but which are not offered as possible responses to the item can be discounted by the student.

Constructed response items, on the other hand, call for responses made up in the mind of the student, rather than chosen from a list of options. Paper and pencil, open, and computer or paper based text response constructed response items leave the students entirely unbounded in their response. This openness nearly eliminates the error in assessments based on "guessing", but doesn't provide for any support for the student to ensure that the item's problem domain was clearly understood.

Computer software applications are available which teach the participant about relationships between various concepts. For example, children's interactive tutorial programs teach children about the relationships between different concepts by manipulating graphic icons on the computer screen in accordance with instructions provided by the program. For example, the child may be requested to match one object (e.g., a key) with a letter associated with it with a complimentary object (e.g., a keyhole) with the same letter on it. The child may be asked to associate a baby animal (e.g., a puppy, a kitten, a calf, a piglet) with an adult animal (e.g., dog, cat, cow, pig) of the same species based on the sound made by or the appearance of the baby animal—for example, by clicking on the baby animal and dragging it to one of a group of different adult animals. The child may be asked to drag objects of different shapes into correspondingly-shaped "holes." The child may be presented with part of an incomplete pattern and a variety of objects from which to choose to complete the pattern by selecting the correct objects and placing them in the proper relationship with respect to each other.

Such exercises are more akin to restricted response assessment items; the participant is typically offered a limited choice of options available for manipulating the graphic icons. Moreover, such exercises are primarily a teaching tool, rather than an assessment tool. Typically, the program will not allow the participant to make an incorrect choice—e.g., the child will not be allowed to place a circular object into a triangular hole—, and if an incorrect choice is permitted, the participant is immediately advised in some manner that the choice is incorrect and encouraged to try another choice. In this regard, the program is teaching the participant about the correct relationships of the different concepts—e.g., the puppy goes with the dog, the kitten goes with the cat, the calf goes with the cow, and the piglet goes with the pig—; it is not testing the extent of the participant's cognitive understanding of the relationships of the different concepts.

SUMMARY OF INVENTION

Aspects of the invention provide for defining rubrics (i.e., a scoring tool, or a set of criteria, used to evaluate a student's response) in terms of cognitive relationships between facts and/or concepts available for student manipulation in a constructed response in a useful, efficient, and cost effective manner. Aspects of the invention also provide for defining a multiplicity of implications (i.e., outcomes corresponding to the student's response) based upon evaluation of different fact and/or concept patterns created by the student responding to the constructed response items. Aspects also provide for design of items (i.e., questions or problems) which can be administered across multiple administration modalities, including manual and computer-based administration. Aspects of the invention also provide for automated scoring of all these administration modalities.

A system embodiment of the invention comprises communicating coupled devices, including one or more content creation engines coupled to one or more rubric engines coupled to one or more administration engines—which may be either manual, computer-based, or both—coupled to one or more scoring engines. This communication can be within the same computer, over any communication network, public or private, including a local area network (LAN), wide area network (WAN), telephone network, cellular phone network, pager network, and Internet, etc., or by any combination of some or all of these communication pathways.

A content creation engine comprises a concept creator which enables an item designer to create concepts or facts, a template selector which enables an item designer to choose templates to be used for presenting the content, and a representation linker which enables an item designer to define associations between concepts and one or more physical or virtual devices, such as, blocks, balls, toys, images, sounds, video stream, text, etc. for representing concepts and which can be manipulated by a person, with or without a computer system, to create a pattern or arrangement of these devices as a response to an item.

A computer based administration engine comprises a representation engine which presents the devices which have been chosen to represent the concepts to the user for manipulation, a manipulation engine to enable the person responding to an item to manipulate the devices to create a pattern, or arrangement of devices, and an attribute acquisition engine to retrieve and record the attributes of the devices (i.e., the position, orientation, relation with respect to other devices, etc.) once the manipulation by the user is completed.

A manual based administration engine comprises a setup process describer engine to provide to the administrative user descriptions of the setup process and devices to be used by the student user, an interaction and manipulation process engine to provide information on the process manipulation of the devices, an attribute acquisition process engine for retrieving and recording attributes of manipulated devices, which may include manual or computer automated aspects or both, and an attribute transformation engine to convert the attributes into the same format as the output from the attribute acquisition engine of the computer based administration engine.

A rubric engine comprises a pattern definer for creating sets of concept and/or fact relationships from predefined cognitive relationships and an implications definer for indicating a given pattern set's implications. That is, the pattern definer defines relationships (i.e., patterns) of each fact or concept associated with a constructed response item to other facts or concepts associated with the item. The defined patterns will be used to assess and evaluate the patterns created by the student. The present invention relies on comparisons of relationships between facts or concepts—rather than comparisons of the absolute values of attributes of the devices chosen to represent particular facts or concepts—to assess and evaluate constructed responses. In this manner, the pattern(s) defined for assessing and evaluating a response for a particular constructed response item will always be valid for that item, regardless of what devices are selected to represent the facts or concepts involved and regardless of the modality chosen for presenting the item.

An "implication" is information about processes or states for a system or person as the result of a pattern being found in the student response to an item. The invention allows for one or more implications to be defined for each pattern. These implications can be used to define such things as the raw score for an item, the identification number or reference to the next item to be given to a student, a text string to be returned to the student or printed in a report, the probability or likelihood of the student knowing a particular standard, a sound to play during administration, a graphic to be displayed on screen, possibly in a report or during an administration, an animation path definition to show the student, etc.

A scoring engine comprises a pattern recognition and comparison engine to identify patterns, which exist both in the device attributes received from the administration engines and those from the rubric engine, an implications selector to allow for a subset of the available implication types to be returned, and a results engine to return results in the desired format.

Utilization of the invention leads to a greater flexibility in ascertaining the level of understanding that a student has in the subject area being assessed or instructed. There are significant advantages to the use of this form of dimensional modeling item. The advantages of this invention include new types of response bounding, concept definition, rubric definition, administration flexibility, and automated scoring speed and feasibility.

Constructed response items created using dimensional modeling according to the present invention provide a boundary of the item's problem domain much like that of multiple choice response items. The students can't just answer in anyway they choose, instead they must use the devices provided and may change only those attributes of the devices that the item design allows to be changed. Errors in analysis of student responses due to students guessing at answers are reduced as compared to multiple-choice response items because the number of possible permutations in the answer to the problem is generally higher than the number of possible choices practical with multiple-choice items, thereby making pure guessing a less feasible option for the student. The type of assessment item developed in accordance with the invention should also result in lower instances of "clueing," whereby the distracters and item construction give clues as to the correct response to the item. Clueing is a problem common with multiple-choice type items.

Item creation using an embodiment of the invention involves creating a set of concepts by either creating new concepts or selecting concepts already created and stored and cataloged in a database, choosing administration templates, selecting devices to represent the concepts within each template, defining a rubric consisting of patterns of relationships between concepts (i.e., conceptual relationships), as represented by the devices, and defining implications of the existence of those patterns in the response. This method of creating an item can allow for the construction of items which have multiple parts, where the parts are dependant items, each of which can be administered either manually or using a computer, dependant on the needs of the student and/or purpose of the test.

By way of example, item designers may use the invention to associate concepts such as "Sun", "Moon", "Frog", "Romance", "Like", "Dislike", "Days", "the number 3", "the sound of a dog barking", or "the letter A", with uniquely-designated devices that can be manipulated by the user, such as, GIF images, AU sound files, text strings, toy balls, rulers, video tape, DVD, cassette tape, etc. During item administration, the student can demonstrate his knowledge of the conceptual relationships that exist between these concepts by manipulating these devices in relationship to each other.

The rubric for each item is a set of relationships between these concepts and is independent of the devices associated with each concept. This means that the student could use different administration processes to demonstrate the knowledge they have about the concepts assessed in the item once the concepts have been generated and associated with specific device representations. By utilizing a conceptual relationship set definition for correct and incorrect possible resulting responses from an item, the item designer is able to specify in a very compact, intuitive way the implications of any or all of the resulting patterns that are valuable for instruction or assessment.

This conceptual rubric is preferably written in a formalized language that will be easy for the item writers and editors to assimilate because it will build upon the manner in which constructed response rubrics are written using natural language today. The use of this formalized rubric language also eliminates the need for the item writer to interact directly with a programming environment or understand the mathematical construction of a solution set.

Since the rubrics and concepts defined for the items are not dependant on the actual devices associated with the concepts, the same item conceptual definition can be used to allow the student to demonstrate knowledge of the conceptual relationships specified in the item design using various technologies, or using manual administration processes. This allows the effort in creating the concept definitions and generating the types of relationships being assessed to be reused across multiple testing systems. It also allows for a greater ease in use of items designed today for use with tomorrow's technological advances. It also allows for students with various special needs to be assessed on the same conceptual relationships as other students without such special needs by merely selecting devices that are appropriate to the student's needs and abilities as the devices associated with the specific concepts.

The scoring engine uses the formal concept definitions from the rubric, making automated scoring feasible, reproducible, and fast.

The scoring engine receives device attributes from the administration process and converts them to conceptual patterns, which it then compares to patterns defined in the rubric. By passing device attributes to the scoring engine, rather than scores, multiple administrations can use the same scoring logic.

Once the scoring engine identifies all of the pattern matches, and determines if there are any completed sets of concept patterns within the response which match those defined in the rubric, it then identifies the resulting set of implications corresponding to the matched concept patterns defined in the rubric and returns a set of implications filtered by the type of implication desired in that particular testing. This allows for the same item design to be utilized in different assessment scenarios, such as returning a raw score for a standardized norm referenced test, a domain to test next for a diagnostic assessment, or other test purpose implication requirements.

Thus, the respondent will be presented with a number of devices, each associated with a different concept, and will be asked to demonstrate his or her knowledge of the conceptual relationships associated with a particular scenario presented to the respondent in a stimulus. The respondent will then manipulate one or more attributes (e.g., its color, size, orientation, location, sound, volume, texture, pattern, smell, taste, elasticity, weight, transparency, absorbency, reflectivity, shape, electrical charge, magnetism, temperature, conductivity, composition, intensity, perspective, emotion, etc.) of one or more of the devices to create an arrangement of the manipulated devices that reflect the respondent's understanding of the conceptual relationship associated with the scenario.

The response will not be completely unbounded in that the arrangement must be created using one or more of the devices presented, of which only certain attributes will be manipulable. On the other hand, within the constraints of the devices presented and the attributes which may be manipulated, the response is otherwise unbounded. The arrangement created is converted to a conceptual pattern, and the conceptual pattern created by the respondent is compared to conceptual patterns that are defined by the scoring rubric, which include correct patterns (more than one conceptual pattern can be correct), incorrect patterns, and partially correct patterns. The extent to which the conceptual pattern created is correct, incorrect, or partially correct is informative because it does more than tell the educator that the respondent does or does not understand certain concepts; it informs the educator as to what the respondent does actually understand. Such information can help the educator predict what less advanced concepts the respondent understands or needs to learn as well as what more advanced concepts the respondent may already understand or is ready to learn.

In this regard, the present invention is different from the educational computer applications described above. Responses are far more unbounded than in the educational programs, and the respondent is allowed to create incorrect or partially correct arrangements, as well as correct relationships. And such incorrect and partially correct arrangements are reviewed and analyzed to derive information from them regarding the respondent's level of understanding of the conceptual relationships.

BRIEF DESCRIPTION OF DRAWINGS

FIG. 4 illustrates an item design for a dimensional modeling item in 3 dimensions (x,y,t) for an item designed for assessing specific knowledge of the solar system according to an embodiment of the invention.

FIG. 5 illustrates a template definition according to an embodiment of the invention.

FIG. 10 is a table illustrating the correspondence between concepts and specific devices according to an embodiment of the invention.

FIG. 13 is a table illustrating example concept relationships and example mathematical definitions for various administration types according to an embodiment of the invention.

FIG. 15 illustrates a scoring rubric for the illustration of FIG. 6 according to an embodiment of the invention.

FIG. 20 illustrates a digital recording of a manual administration according to an embodiment of the invention.

FIG. 25 illustrates dimensional data acquisition and attribute acquisition for a computer-based administration of the item illustrated in FIG. 24 according to an embodiment of the invention.

DETAILED DESCRIPTION

Figure 1:
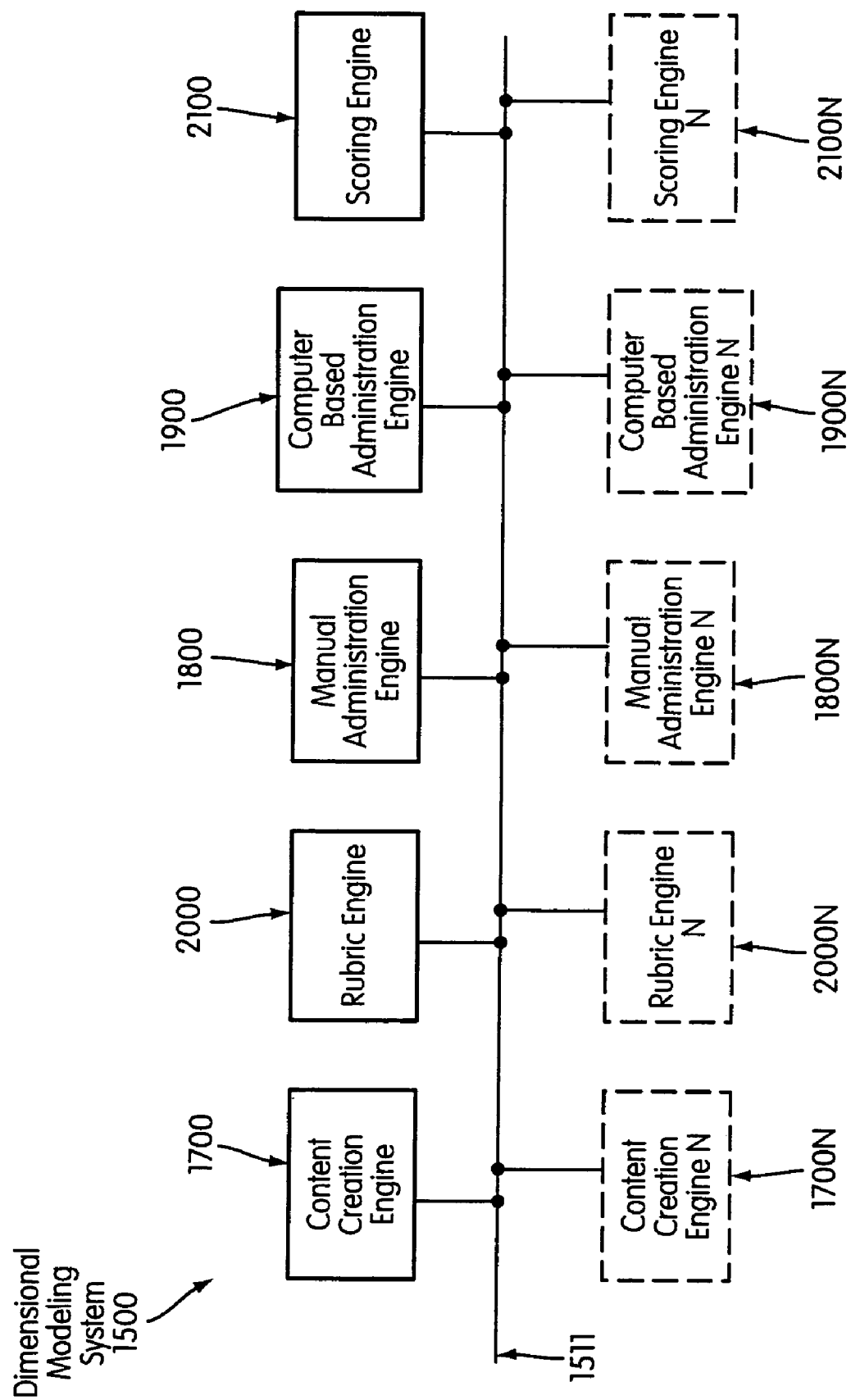
FIG. 1 illustrates a block diagram of dimensional modeling system according to an embodiment of the invention.

Turning to FIG. 1, a suitable dimensional modeling system example 1500 is illustrated according to an embodiment of the invention. As shown, dimensional modeling system 1500 comprises one or more (up to N) content creation engines 1700, 1700N (content creation means) for creating concepts, linking (or associating) those concepts to representational devices, and selecting templates for administration types. Dimensional modeling system 1500 also comprises one or more (up to N) rubric engines 2000, 2000N for defining conceptual relationship patterns and any implications of the patterns. Dimensional modeling system 1500 also comprises at least one administration engine (administration means), which may be one or more (up to N) manual administration engines 1800, 1800N and/or one or more (up to N) computer-based administration engines 1900, 1900N. The administration engines allow the user to manipulate the variable attributes of the devices representing concepts created in the content creation engine 1700 and return the resulting attributes to scoring engines. Dimensional modeling system 1500 also comprises one or more (up to N) scoring engines 2100, 2100N (scoring means) for pattern recognition and comparison of responses from administration engines 1800, 1800N, 1900, and/or 1900N with the pattern(s) defined by the rubric engine(s) 2000, 2000N (rubric means), and for defining a resulting set of implications and returning the desired implication types. Dimensional modeling system 1500 utilizes communication system 1511 to communicate between its elements. Communication system 1511 can consist of public or private networks, as, described above, or may utilize mobile media such as floppy disk, CD-ROM, computer-readable printed media such as bar codes, smart cards, magnetic stripe cards, natural voice communication, manuscript correspondence, etc.

Figure 2:
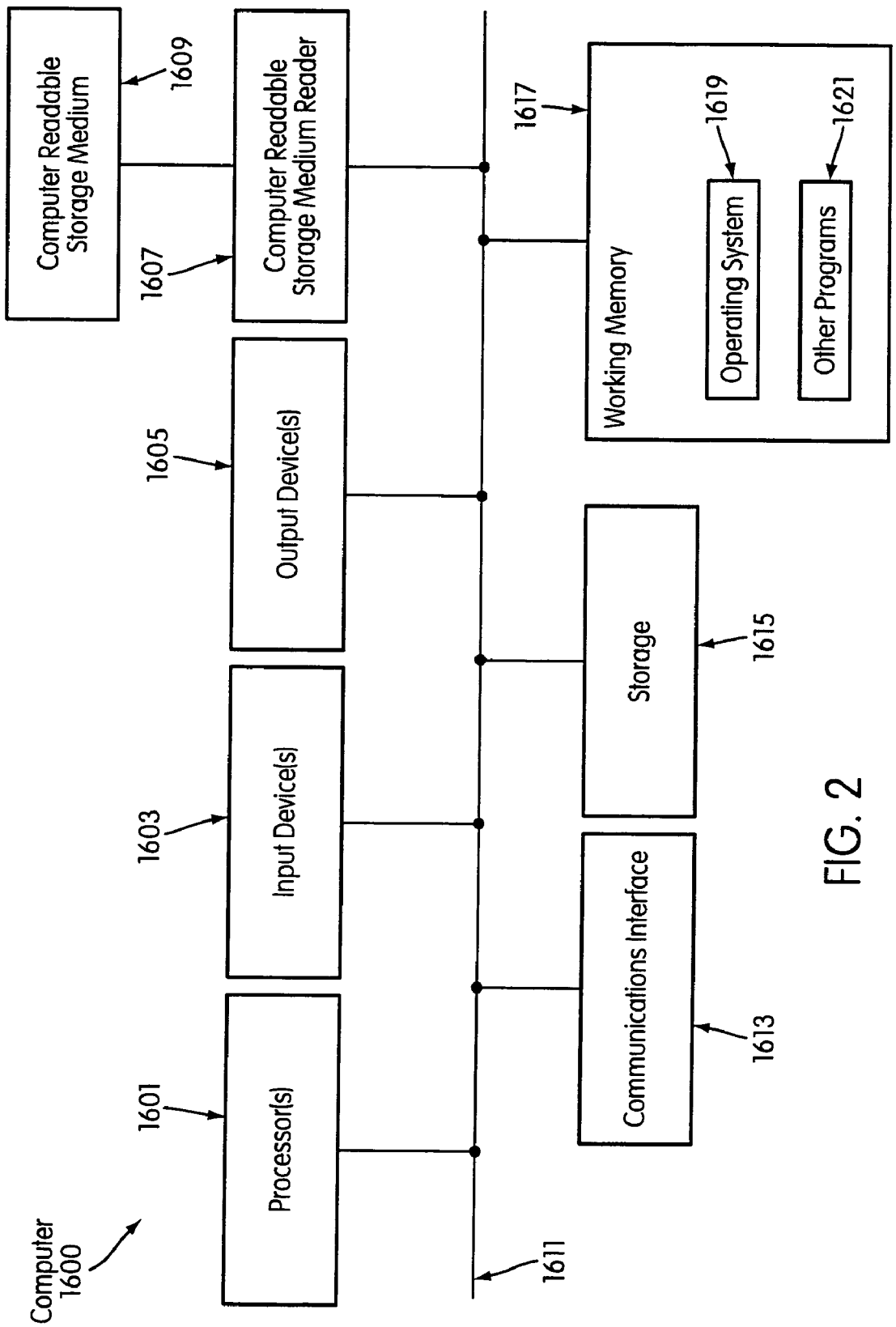
FIG. 2 illustrates a block diagram of a computer according to an embodiment of the invention.

In FIG. 2, computer 1600 may be used by any of the engines of dimensional modeling system 1500 for all or some of its elements, with the exception of manual administration engine(s) 1800, 1800N which must include a manual administration process, along with its other methods that may or may not utilize computer 1600.

Computer system 1600 comprises elements coupled via communication channels (e.g., bus 1611) including one or more special purpose processors 1601, such as a Pentium® or PowerPC®, digital signal processor ("DSP"), etc. System 1600 elements also include one or more input devices 1603 (such as a mouse, keyboard, joystick, microphone, remote control unit, camera, tactile, biometric, or other sensors, etc.), and one or more output devices 1605 (such as a suitable display, joystick feedback components, speakers, actuators, etc.), in accordance with a particular application.

System 1600 also includes a computer readable storage media reader 1607 coupled to a computer readable storage medium 1609, such as a storage/memory device or hard or removable storage/memory media; such devices or media are further indicated separately as storage device 1615 and working memory 1617, which can handle hard disk variants, floppy/compact disk variants, digital versatile disk ("DVD") variants, smart cards, read only memory, random access memory, cache memory, etc., in accordance with a particular application. One or more suitable communications interfaces 1613 can also be included, such as, a modem, DSL, infrared transceiver, etc., for providing inter-device communication directly or via one or more suitable private or public networks, such as those already discussed.

Working memory 1617 further includes operating system ("OS") 1619 elements and other programs 1621, such as, application programs, mobile code, data, etc., for implementing system 1500 elements that might be stored or loaded therein during use. The particular OS can vary in accordance with a particular computing device, features, or other aspects in accordance with a particular application (e.g., Windows, Mac, Linux, Unix, or Palm OS variants, a proprietary OS, etc.). I/O or environmental alternatives capable of being utilized with various operating systems can also be utilized, including, but not limited to, graphical user interfacing, pen-based computing multimedia, handwriting, speech recognition/synthesis, virtual/augmented reality, or 3-D audio/visual elements.

Various programming languages or other tools can also be utilized, such as, for example, Java, Python, and HTML. The above noted interfaces may be written in Macromedia Flash™ using drag-and-drop and vector graphics advanced capabilities to manipulate device attributes. HTTP communication can be used to deliver resulting device attributes to the scoring engine. One or more elements of system 1600 can, however, be implemented in hardware, software, or a suitable combination. When implemented in software (e.g., as an application program, object, downloadable, servlet, etc.), in whole or in part, an element of system 1600 can be communicated transitionally or more persistently from local or remote storage to memory for execution, or another suitable mechanism can be utilized, and elements can be implemented in compiled or interpretive form. Input, intermediate, or resulting data or functional elements can further reside transitionally or more persistently in a storage medium, cache, or more persistent volatile or non- volatile memory (e.g., storage medium 1609, or memory 1617) in accordance with a particular application.

Figure 3:
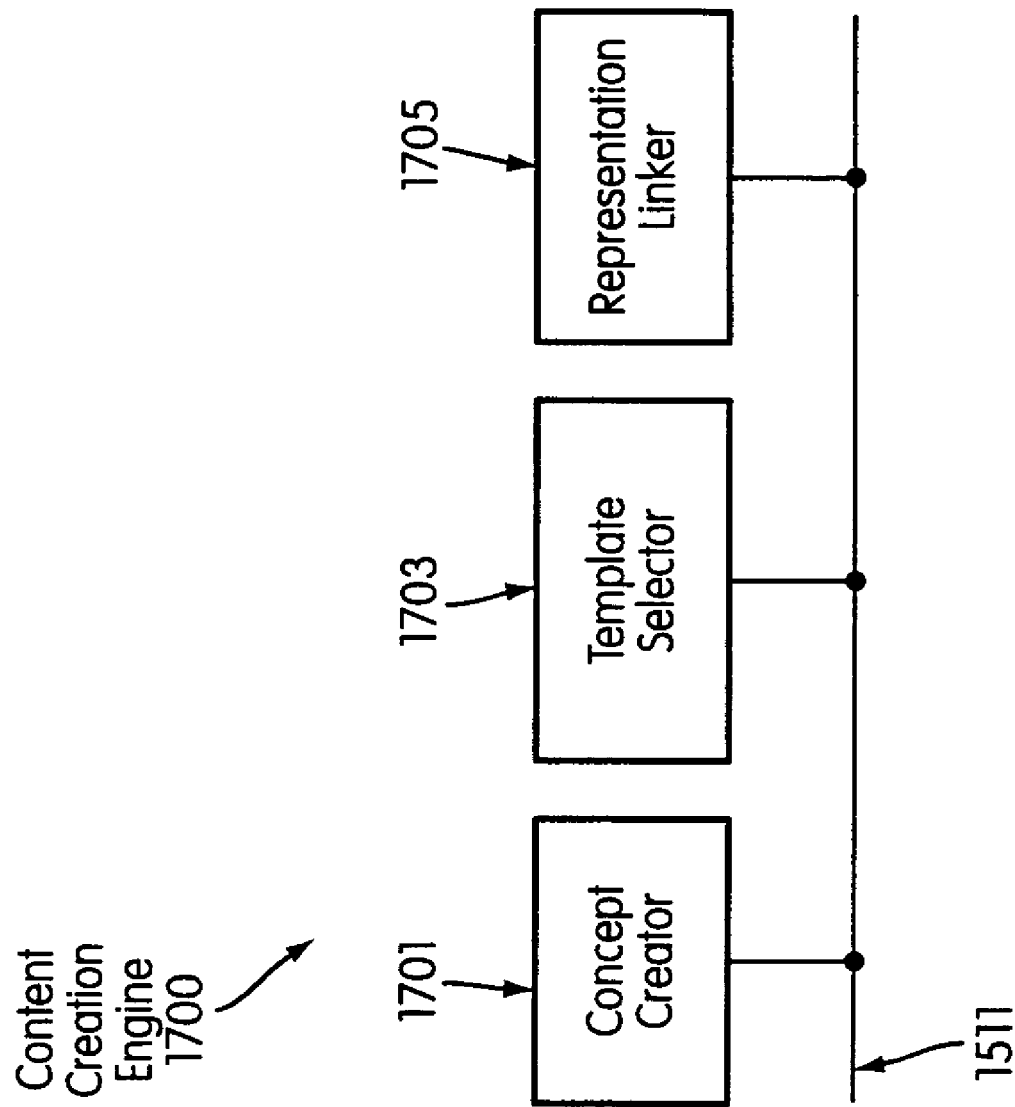
FIG. 3 illustrates a block diagram of a content creation engine according to an embodiment of the invention.

FIG. 3 illustrates a content creation engine 1700 according to an embodiment of the invention. Content creation engine 1700 comprises one or more concept creators 1701, which allow an item designer to select a previously created and stored concept or create a new concept and give the new concept a description. The concept descriptions can include text strings, mathematical formulae, sound files, video streams, image files, numbers, or any other data type including text and binary files. Concepts can be re-used across multiple items (concepts include such things as the planet Earth, Love, mathematical addition, phonemes, a theme, a main character, bouncing, potential energy, molecular valence, narrow-mindedness, etc.).

FIG. 4 illustrates an example item design according to an embodiment of the invention. In the example shown in FIG. 4, the item design is identified by a topic, e.g., "Phases of the Moon," and a unique identifying attribute, such as an ID number. An item name, e.g., "Phases of the Moon Calendar Model", can provide an even more specific identification of the item. The item shown in FIG. 4 requires students to demonstrate knowledge of the relative positions and orientations of the concepts associated with this item—namely, the sun, the moon, and the earth—for different lunar phases. More specifically, the student is asked to show the relative positions of the earth, the sun, and the moon for a particular phase of the moon corresponding to a particular calendar date. Variable attributes, in this case, the two-dimensional spatial and temporal coordinates (x, y, t), of each of the concepts are defined. These attributes can be manipulated by the respondent, and their final values will determine the relations of the concepts (i.e., the conceptual pattern), thereby allowing an assessment of the correctness of the test-taker's response.

Although shown in FIG. 4, it is not necessary to define the variable attributes in the item design; they may be defined through template selection.

Content creation engine 1700 also includes template selector 1703, which allows the item designer to select from a pool of templates for computer or manual administration, or both. These templates define the device types and attributes which are variable for the devices. Templates control what types of devices and which attributes of those devices can be modified. For example, one template might allow for image devices to be used and their x, y spatial positions to be manipulated. Examples of other device attributes that can be manipulated include, color and/or brightness, sound and/or volume, texture, pattern, smell, taste, elasticity, weight, transparency, absorbency, reflectivity, shape, electrical charge, magnetism, temperature, conductivity, composition, intensity, perspective, emotion, etc.

An example of a template definition is shown in FIG. 5. The template definition includes a unique identifying attribute, such as ID No. 00345, and a name, e.g., "2-D Position Modeling Template." The template includes a short description of the template formats and implementation, device types, and variable attributes. The example shown is a template for use in connection with a constructed response item requiring the test taker to demonstrate knowledge of the relative positions and orientations of two or more concepts in a two-dimensional space. Finally, the template includes an output description and the output data format.

Figure 6:
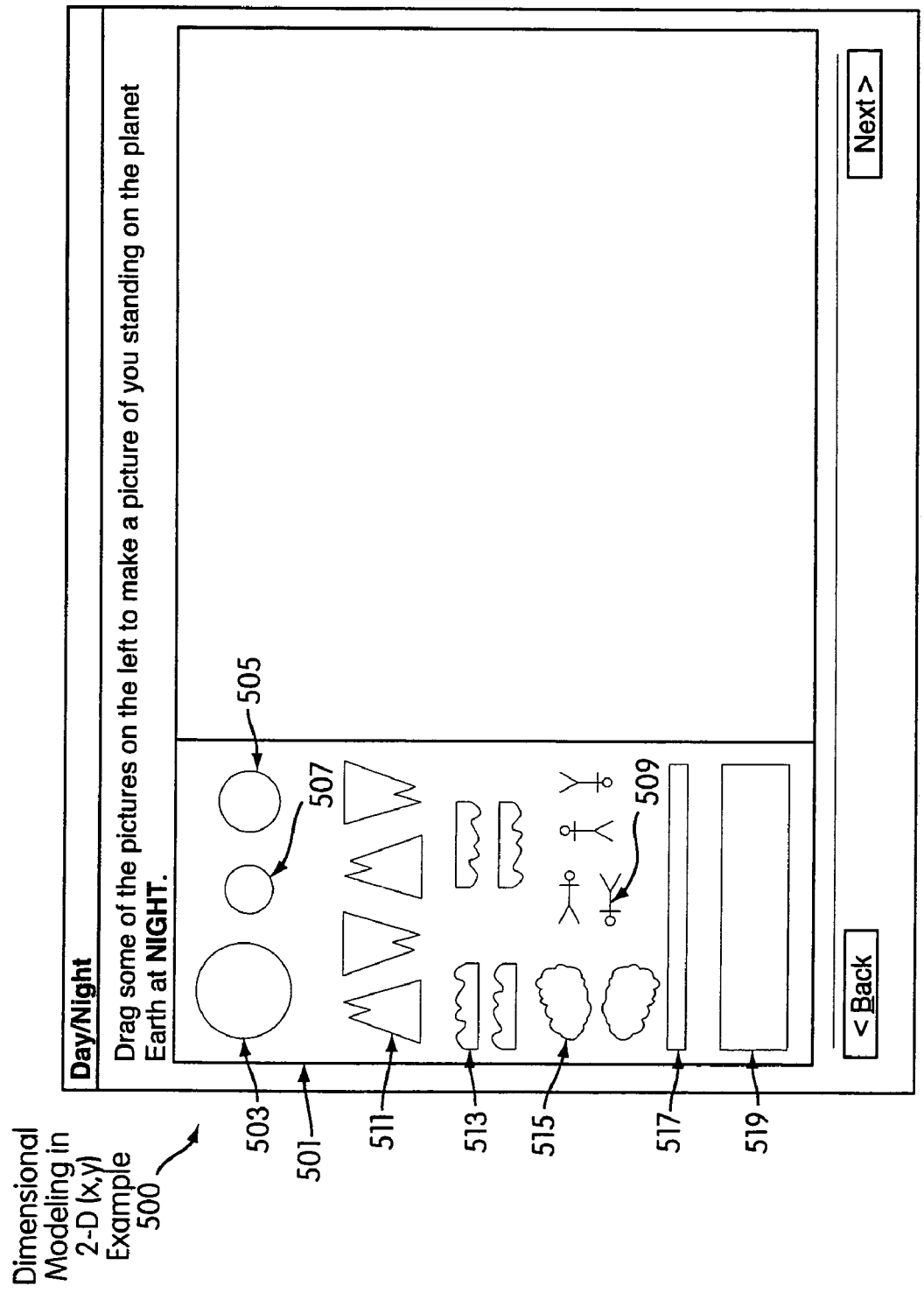
FIG. 6 illustrates dimensional modeling in 2 dimensions (x,y) for computer-based administration for an item designed around assessment for solar system content according to an embodiment of the invention.

Template implementations can be expressed in a variety of computer and natural languages. FIG. 6 shows a screen shot of an example of a Macromedia Flash™ implementation of an item 500 employing the template definition shown in FIG. 5 which includes a menu 501 of devices associated with particular concepts, including the planet Earth (represented by device 503), the Moon (represented by device 507), the Sun (represented by device 505), persons in different orientations (represented by devices 509), trees (represented by devices 511), land forms (represented by devices 513), clouds (represented by devices 515), the earth's surface (represented by device 517), and the earth as a flat body (represented by device 519). The X and Y coordinates of each device can be manipulated by the student by clicking on the image or animation and dragging it to a new location.

Other Macromedia Flash™ template examples 520, 540, 560, and 900, which illustrate items in which attributes other than X and Y coordinates may be varied, are shown in FIGS. 7a, 7b, 7c, and 7d, respectively.

Figure 7A:
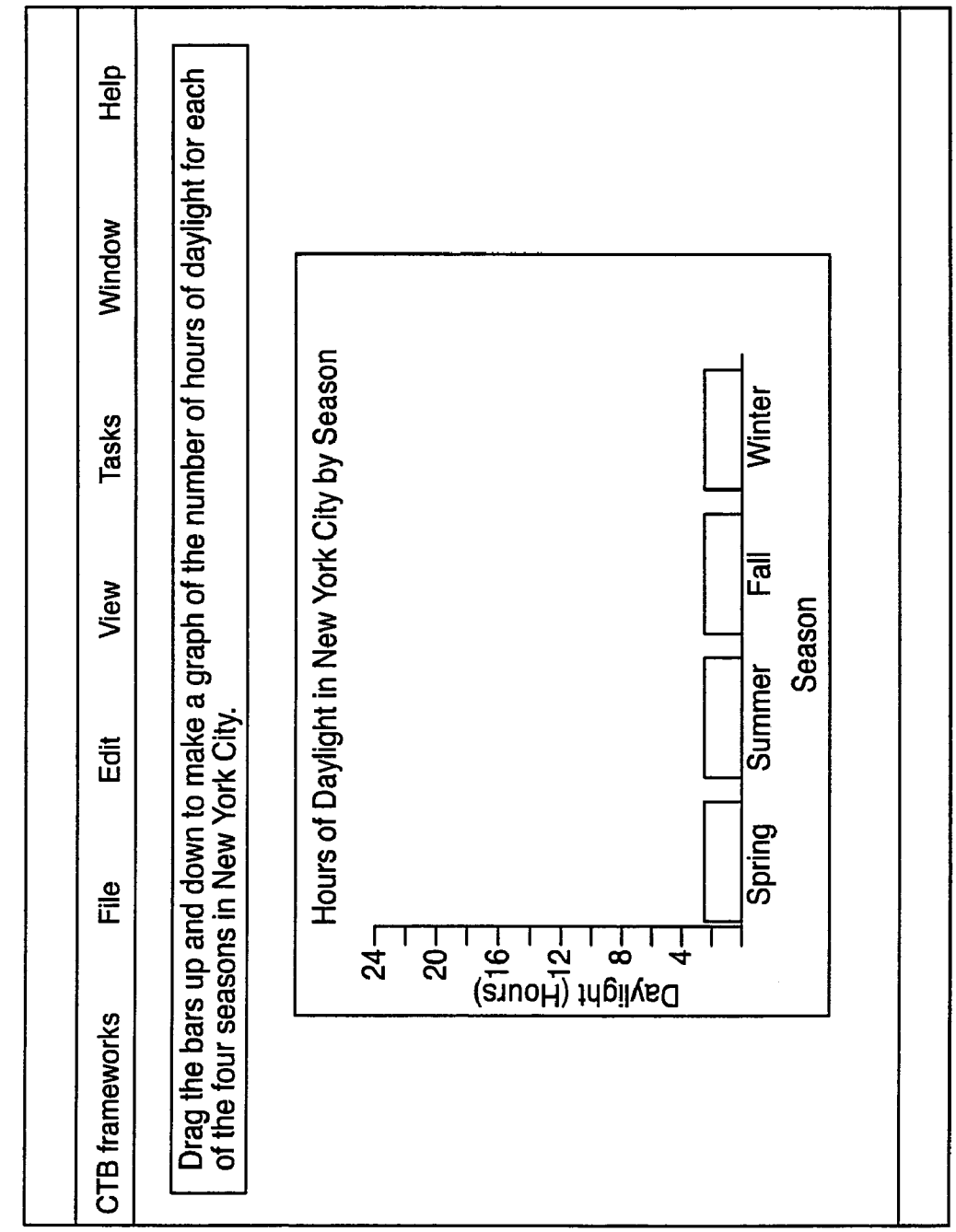
FIG. 7a illustrates dimensional modeling with height variance for computer-based administration for an item designed around assessment for solar system content according to an embodiment of the invention.

The dimensional modeling item 520 shown in FIG. 7a is a simple bar graph in which the height of each of four bars may be adjusted by the student to demonstrate knowledge of the amounts of daylight in New York City in each of the four seasons of the year.

Figure 7B:
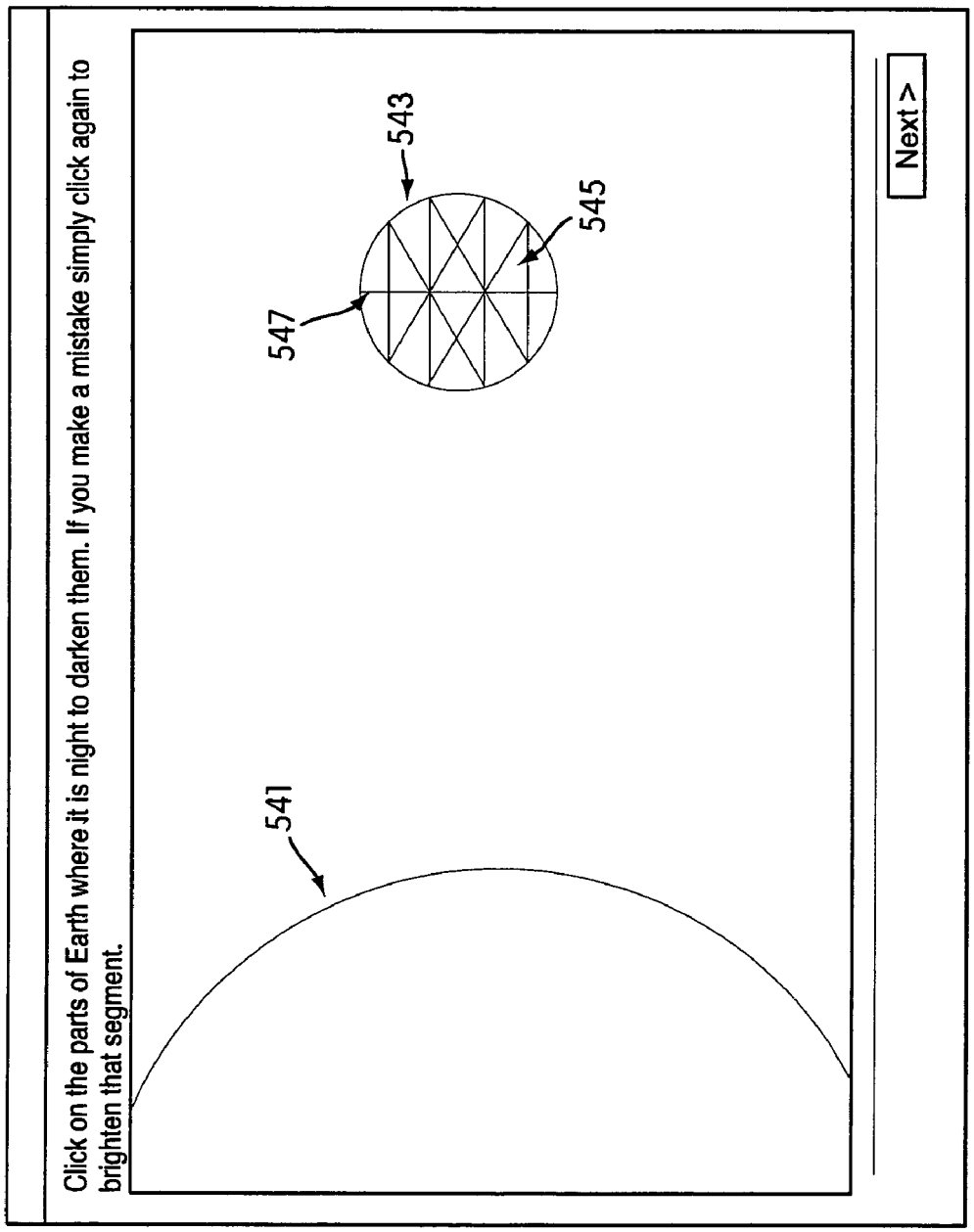
FIG. 7b illustrates dimensional modeling with color variance for computer-based administration for an item designed around assessment for solar system content according to an embodiment of the invention.

The dimensional modeling item 540 shown in FIG. 7b includes a representation of the sun 541 and the earth 543 located adjacent to the sun. The earth 543 is divided in two by longitudinal line 547 and includes a number of triangular segments 545. The student can demonstrate an understanding of the relationship between daytime and nighttime and the relative orientations of the sun 541 and the earth 543 by clicking on (or otherwise darkening) those of the segments 545 that would be dark (i.e., nighttime) in correspondence with the sun 541/earth 543 orientations shown.

Figure 7C:
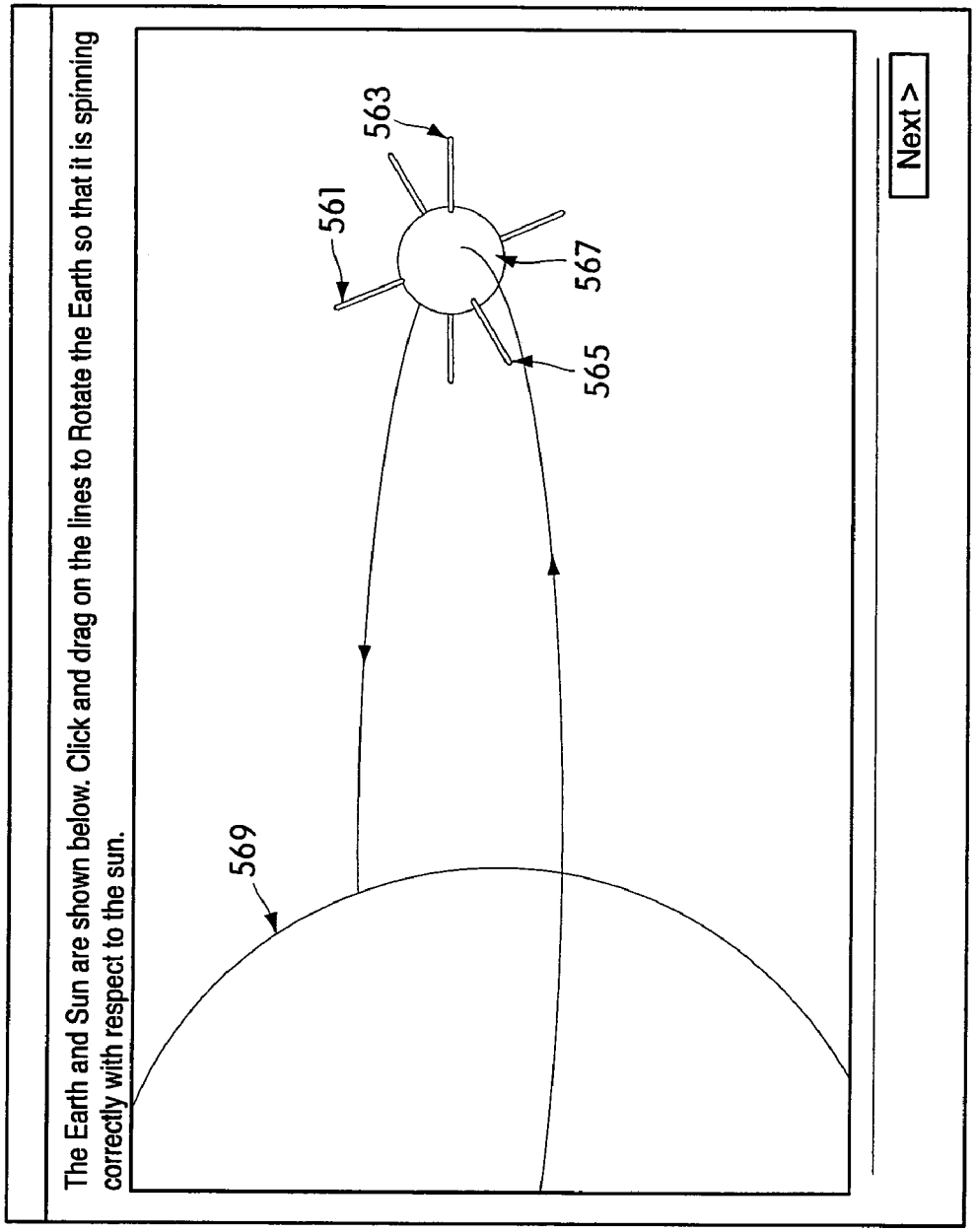
FIG. 7c illustrates dimensional modeling with orientation variance for computer-based administration for an item designed around assessment for solar system content according to an embodiment of the invention.

The dimensional modeling item 560 shown in FIG. 7c includes a representation of the sun 569 and earth 567 on its orbit around the sun. Three mutually orthogonal axes 561, 563, and 565 extend from the earth 567. The student may demonstrate an understanding of the rotation of the earth 567 by manipulating (e.g., clicking on and dragging) one of the axes 561, 563, 565 to cause the earth to spin around that axis.

Figure 7D:
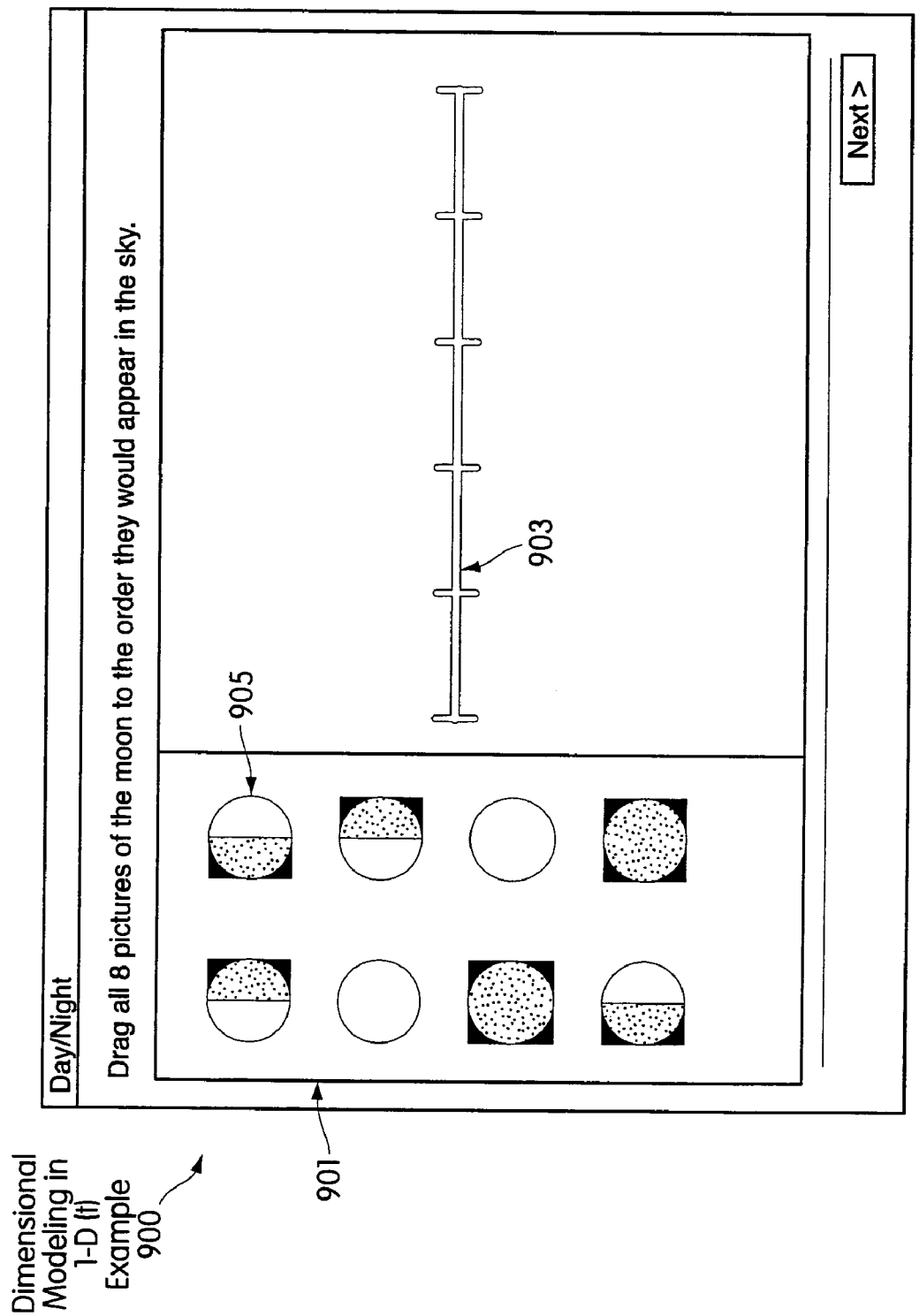
FIG. 7d illustrates dimensional modeling in 1 dimension (t) for computer-based administration for an item designed around assessment for solar system content according to an embodiment of the invention.

Finally, in the dimensional modeling item 900 shown in FIG. 7d, a menu 901 includes eight representations 905 of the moon, each a different phase, and a time line 903. The student may demonstrate knowledge of the monthly progression of the lunar phases by placing the eight representations 905 in the proper order on the time line 903.

Figure 8:
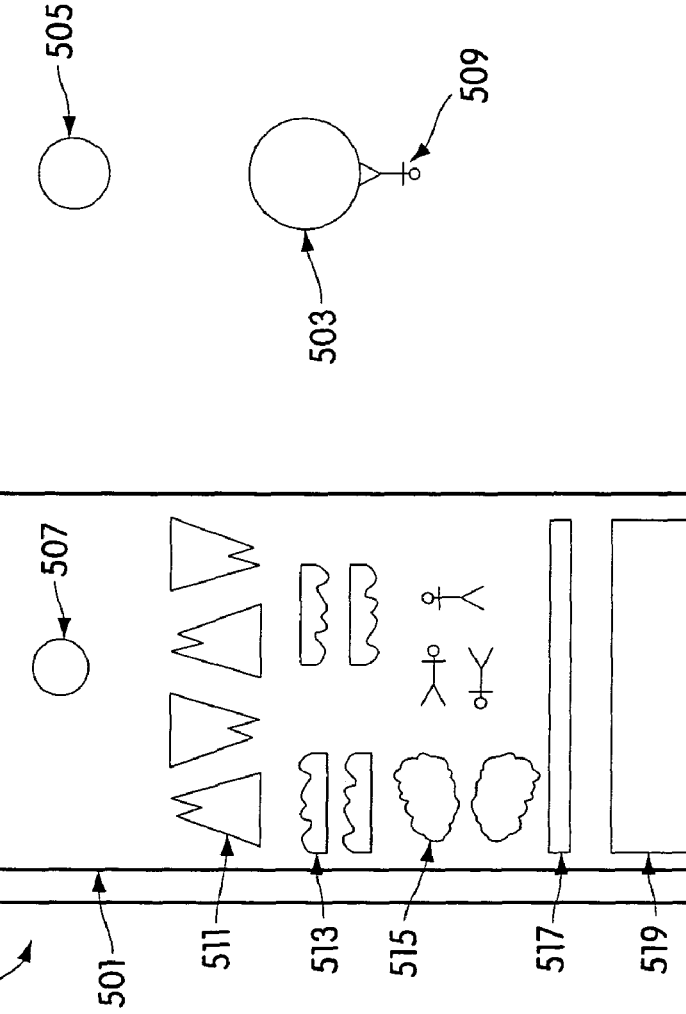
FIG. 8 illustrates a possible resulting pattern for the 2 dimensional modeling of FIG. 6 according to an embodiment of the invention.
Figure 9:
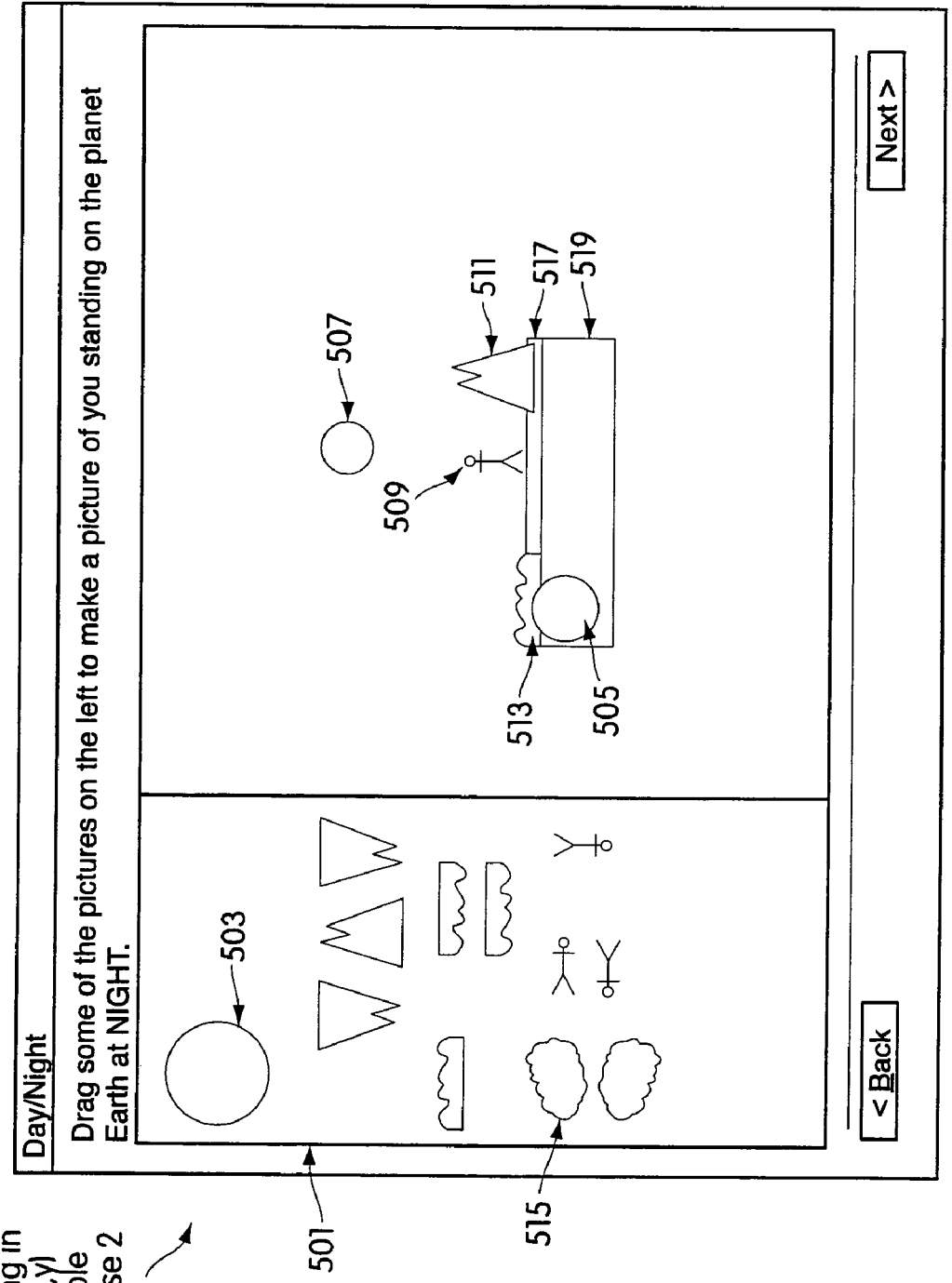
FIG. 9 illustrates another possible resulting pattern for the 2 dimensional modeling of FIG. 6 according to an embodiment of the invention.

FIGS. 8 and 9 show examples of possible responses to the item of FIG. 6. In FIG. 8, the items 505, 503 and 509 have been manipulated in response to the stem "Drag some of the pictures on the left to make a picture of you standing on the planet Earth at NIGHT" to represent that at night a person 509 is on the side of the earth 503 opposite the sun 505. In FIG. 9, various items have been manipulated in response to the same stimulus to demonstrate that at night the moon 507 is generally above a person 509 standing on the earth's surface 517 with trees 511 and other land forms 513 properly oriented on the earth's surface 517 and the sun 505 below, (or beneath or behind) the earth's body 519. The arrangements shown in FIGS. 8 and 9 are created from the same group of available devices, and, although the arrangements shown in the two figures are substantially different, both define a conceptual pattern indicating that the creator of each arrangement has a generally correct cognitive understanding of the relationships between concepts such as you, the moon, the sun, and the earth.

As further shown in FIG. 3, concept creation engine 1700 also include representation linker 1705 which allows the item designer to link, or associate, concepts to manipulable devices available in the templates. Concepts previously created may already have these linkages. FIG. 10 illustrates device linkage examples for concepts such as the sun, the earth, the moon, time, a full moon, a half waning moon, a new moon, and a half waxing moon.

Figure 11:
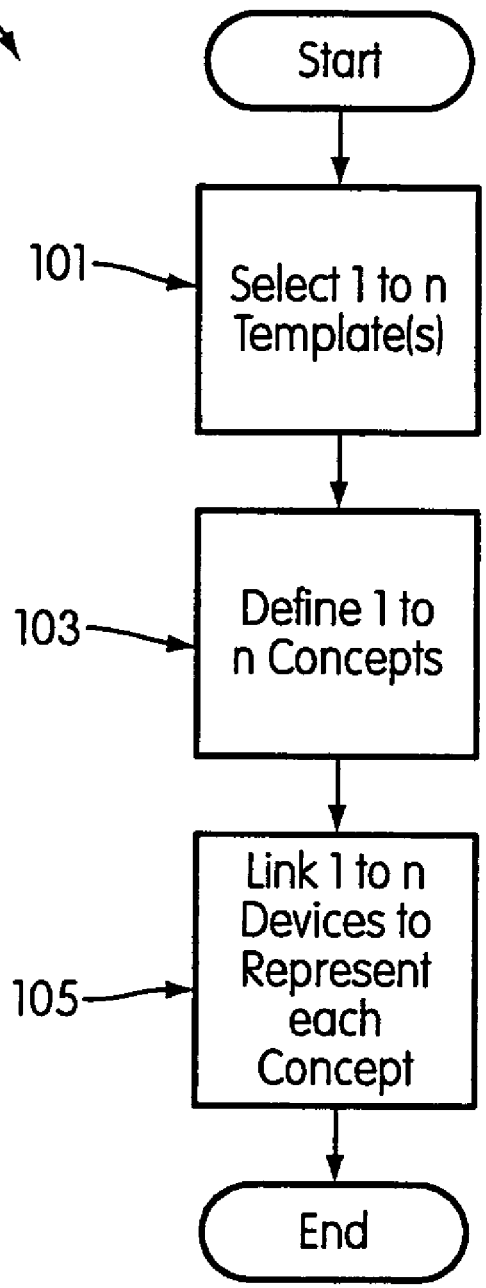
FIG. 11 is a flowchart illustrating a content creation process according to an embodiment of the invention.

FIG. 11 is a flowchart illustrating a content creation process 100 according to an embodiment of the invention. In step 101 of the process 100, the item designer selects one or more template(s) corresponding to the type of devices and manipulable attributes that are appropriate for the item(s) being designed. In step 103, the item designer defines one or more concepts corresponding to the item(s) being designed. Preferably, the number of devices defined by the template is at least as great as the number of concepts. Finally, in step 105, each device selected as part of step 101 is linked to one of the concepts defined in step 103.

Figure 12:
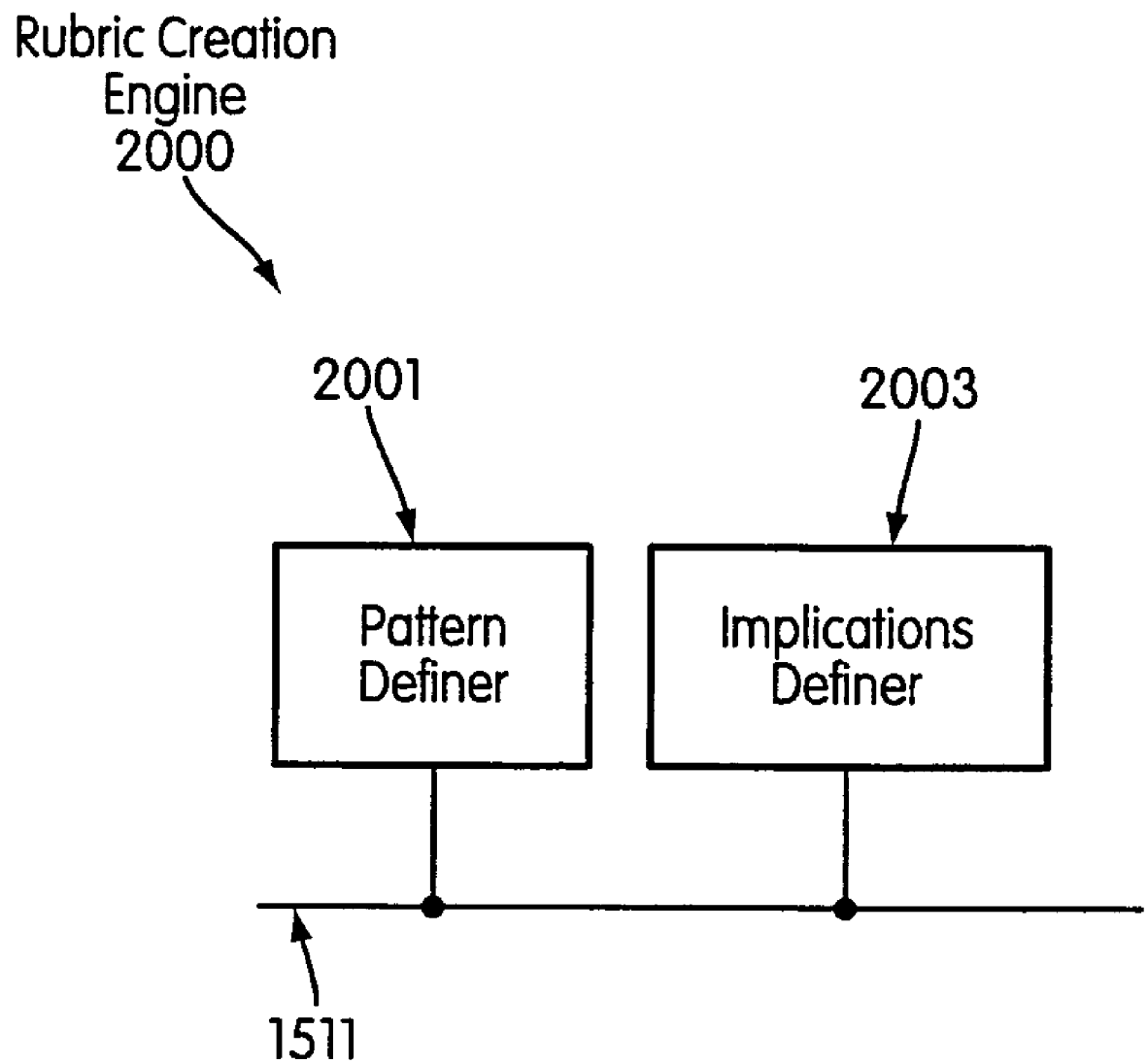
FIG. 12 illustrates a block diagram of a rubric creation engine according to an embodiment of the invention.

FIG. 12 illustrates a rubric engine 2000 according to an embodiment of the invention. The rubric engine 2000 allows the designer to create a set of conceptual rubric patterns, or device arrangements, using pattern definer 2001, that define device arrangements that correspond to correct and incorrect responses that are possible with the templates selected using template selector 1703 of the content creation engine 1700 (see FIG. 3). These pattern sets may define all possible patterns into which the available devices can be manipulated or only some subset of all possible patterns. Each of the rubric patterns consists of sets of sub-patterns consisting of relationships between concepts (as represented by representational devices) defined using concept creator 1701 of the content creation engine 1700. These concept relationships use a formal, defined language, an example of which is shown in FIG. 13 in which relationship definitions between different concepts represented by <A>, <B>, and <C>, each having positions $(x_A, y_A)$, $(x_B, y_B)$, and $(x_C, y_C)$ or $(x_A, y_A, z_A)$, $(x_B, y_B, z_B)$, or $(x_C, y_C, z_C)$ are shown.

Figure 14:
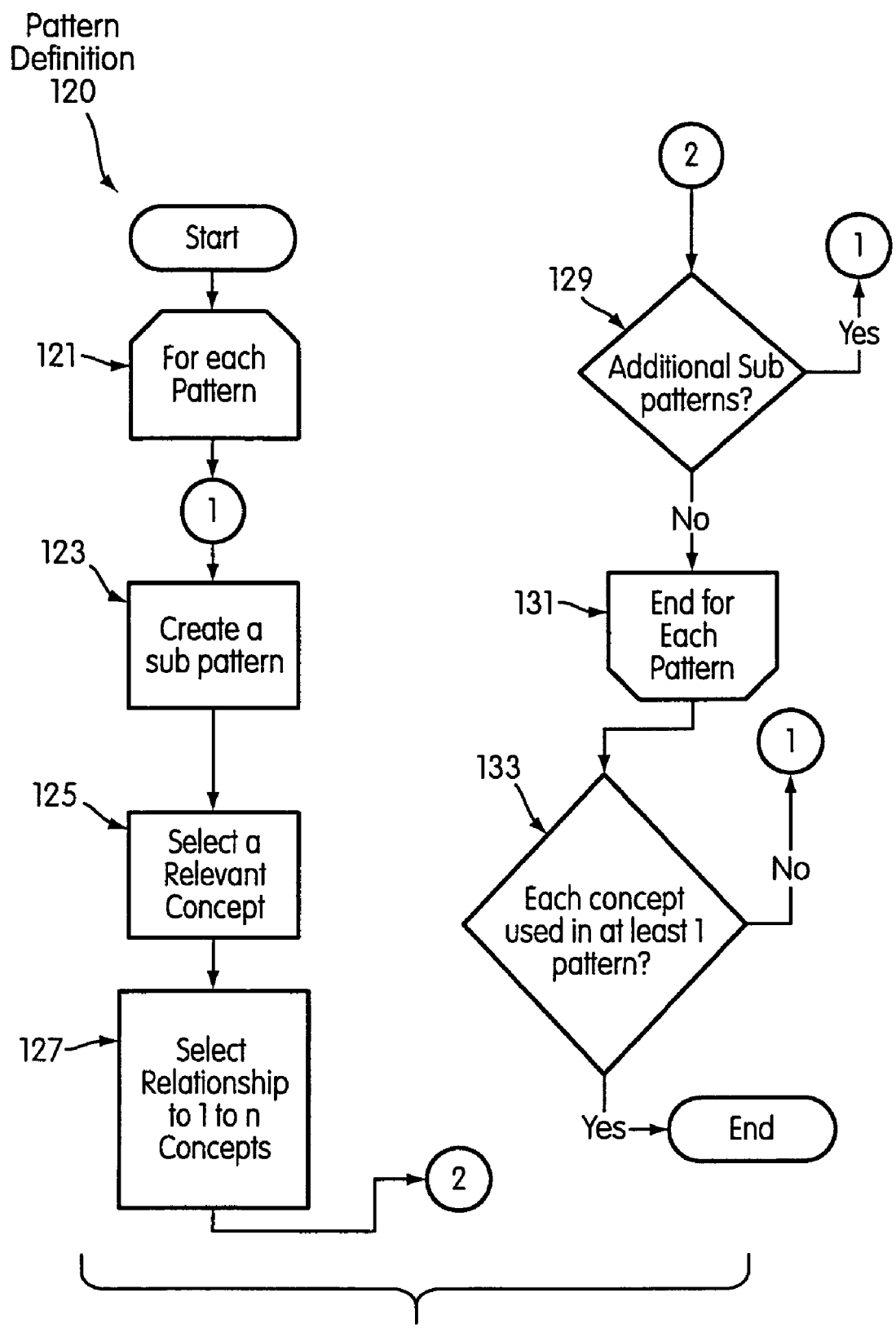
FIG. 14 is a flowchart illustrating a pattern definition process according to an embodiment of the invention.

FIG. 14 illustrates a pattern definition process 120 from an example embodiment of pattern definer 2001. The pattern definition process 120 is applied for each pattern in the rubric, beginning at step 121. A sub-pattern is created (step 123) by selecting a concept that is relevant to the subpattern (step 125) and defining the relationship of the selected concept to the 1-n other concepts (step 127) that have been defined in the content creation process (see FIG. 11). Not all concepts need to be relevant to every pattern in a ruberic. The relationships between concepts between concepts consist of one or more predefined cognitive, physical relationships between concepts, and include relationships, such as "above", "opposite to", "before", "in front of", etc. Whether these are additional subpatterns to be created is determined at step 129. If there are additional subpatterns to be created, the process returns to step 123; if there are no additional subpatterns to be created, the process proceeds to steps 131 and 133. At step 133, it is determined whether each concept is used in at least one pattern. If each concept has been used in at least one pattern of the ruberic, the process 120 is complete; if not, the process 120 returns to step 123 so that additional subpatterns can be created for the unused concepts, if desired.

Rubric engine 2000 also allows the designer to create a set of implications for each pattern using implications definer 2003. Implications, which consist of a type and value pair, define an outcome that occurs if the conceptual pattern created by the student matches the rubric pattern with which the particular implications are associated. Type and values can be defined using any data type, including any kind of text, binary, or analog data.

A partial example of a scoring rubric is illustrated in FIG. 15. FIG. 15 shows implication types and values for different possible patterns and subpatterns created by the student manipulating devices in response to a stimulus requiring the student to demonstrate knowledge and understanding of the relative positions of the sun, the earth, and a person at night time. Only the first pattern/subpattern is correct. The possible implication types include "score", "reward", "correct", "knowledge", and "navigation". Implication values for "score" would be the numerical score the student receives for the response. Implication values for "reward" might be computer files that create a visual image, such as a gold star or happy face for a correct response or a sad face for an incorrect response, and/or an audible signal, such as a bell or a "hurrah" for a correct response or an "oops" or a "good try" for an incorrect or partially correct response. Implication values for "correct" include a binary "1" for a correct response or a "0" for a response that is not correct. Implication values for "knowledge" include a description of the student's level of knowledge estimated from the student's response. Navigation implications provide an ID (i.e., an address) for the following question for use in an adaptive testing format in which the next question to be presented is selected based on the extent to which the student gets the present question correct.

The implications type is useful in allowing the same item to be utilized for multiple test purposes. For example, the "score" type could be used for norm reference tests, whereas the "reward" type might be used for assessment integrated with instruction.

Figure 16:
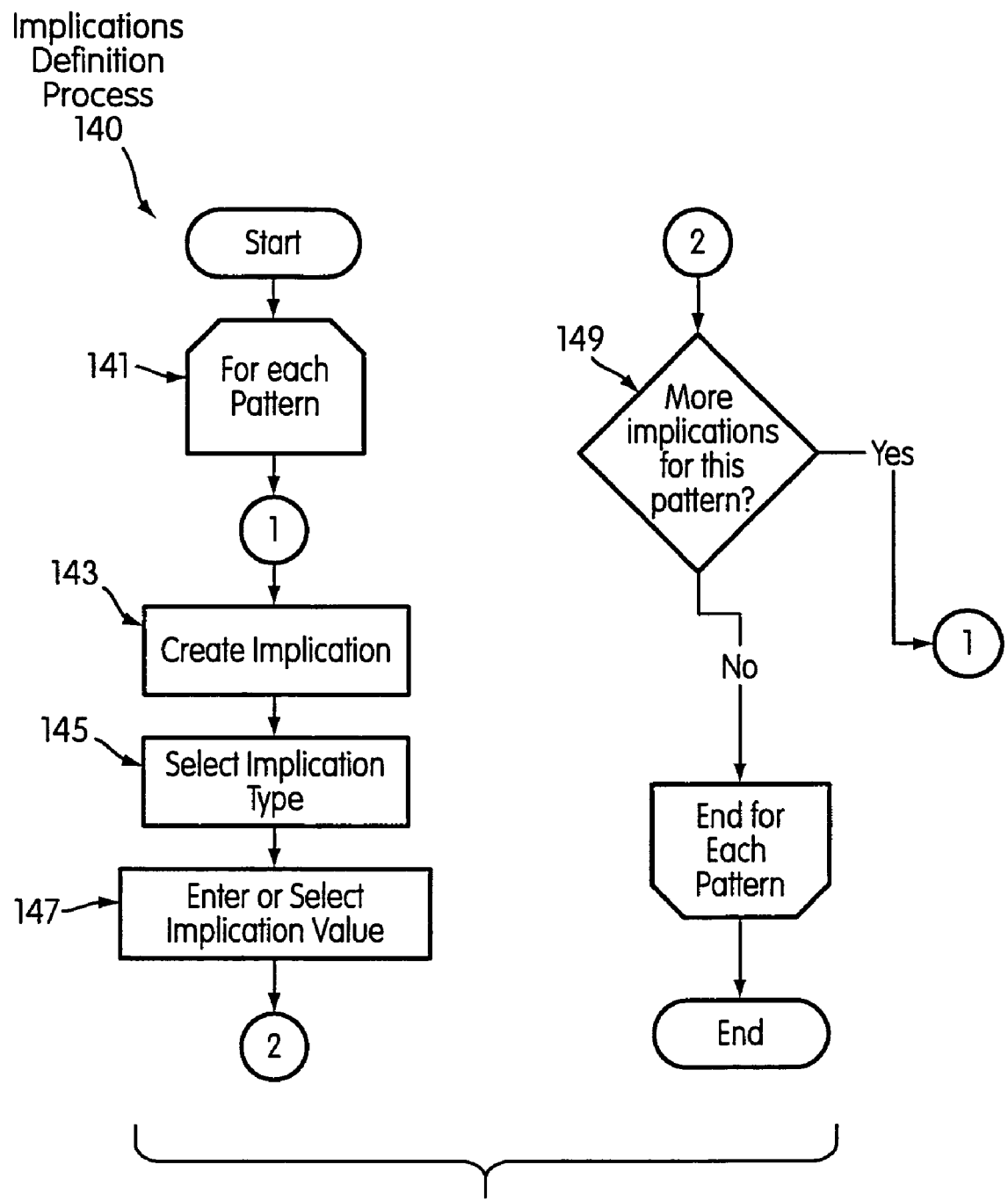
FIG. 16 is a flowchart illustrating an implications definition process according to an embodiment of the invention.

FIG. 16 illustrates an implications definition process 140 from an example embodiment of an implications definer 2003. Starting with step 141, for each pattern defined for a scoring ruberic, an implication is created (step 143) by selecting an implication type (step 145) and entering or selecting an implication value (step 147). Different types of implications may have different structures for the implication value. For example, referring to the sample rubric shown in FIG. 15, if the implication type is "raw score" the value may be "3", for another example if the implication type is "knowledge", the value may be {("earth goes around sun", 0.90), ("lack of sun defines night", 0.45)}, and for another example, if the implication type is "reward", the value may be the image file "goldstar.jpg".

If there are more implications to be defined for the ruberic pattern (step 149), the process 140 returns to step 143. If there are no more implications for the ruberic pattern, the implications definition process 140 is complete as to that process.

Figure 17:
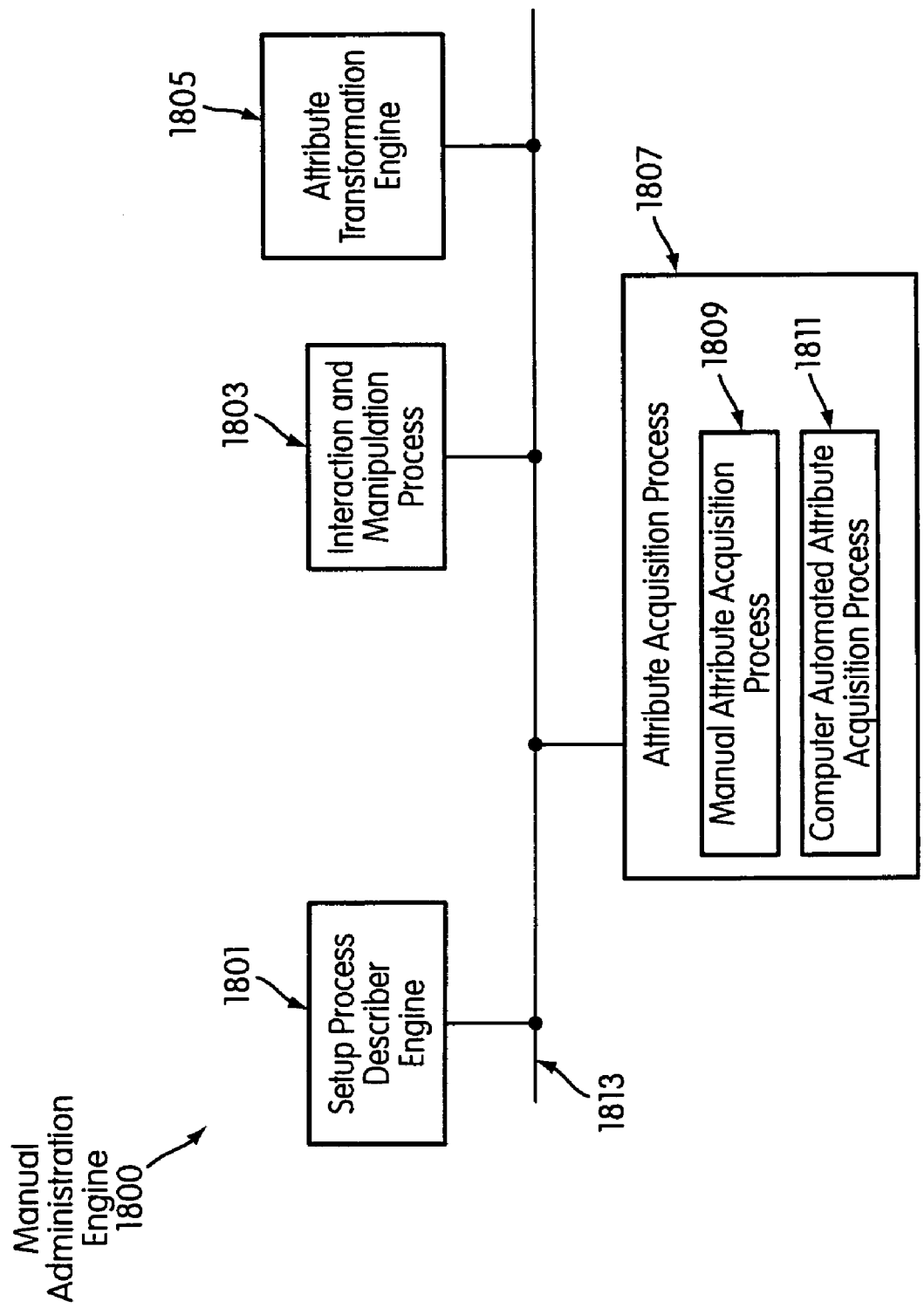
FIG. 17 illustrates a manual administration engine according to an embodiment of the invention.

FIG. 17 illustrates a manual administration engine 1800 according to an embodiment of the invention. Manual administration engine 1800 includes setup process describer engine 1801 which can provide computer or manual based instructions for setting up for the interaction and manipulation process 1803.

Figure 18:
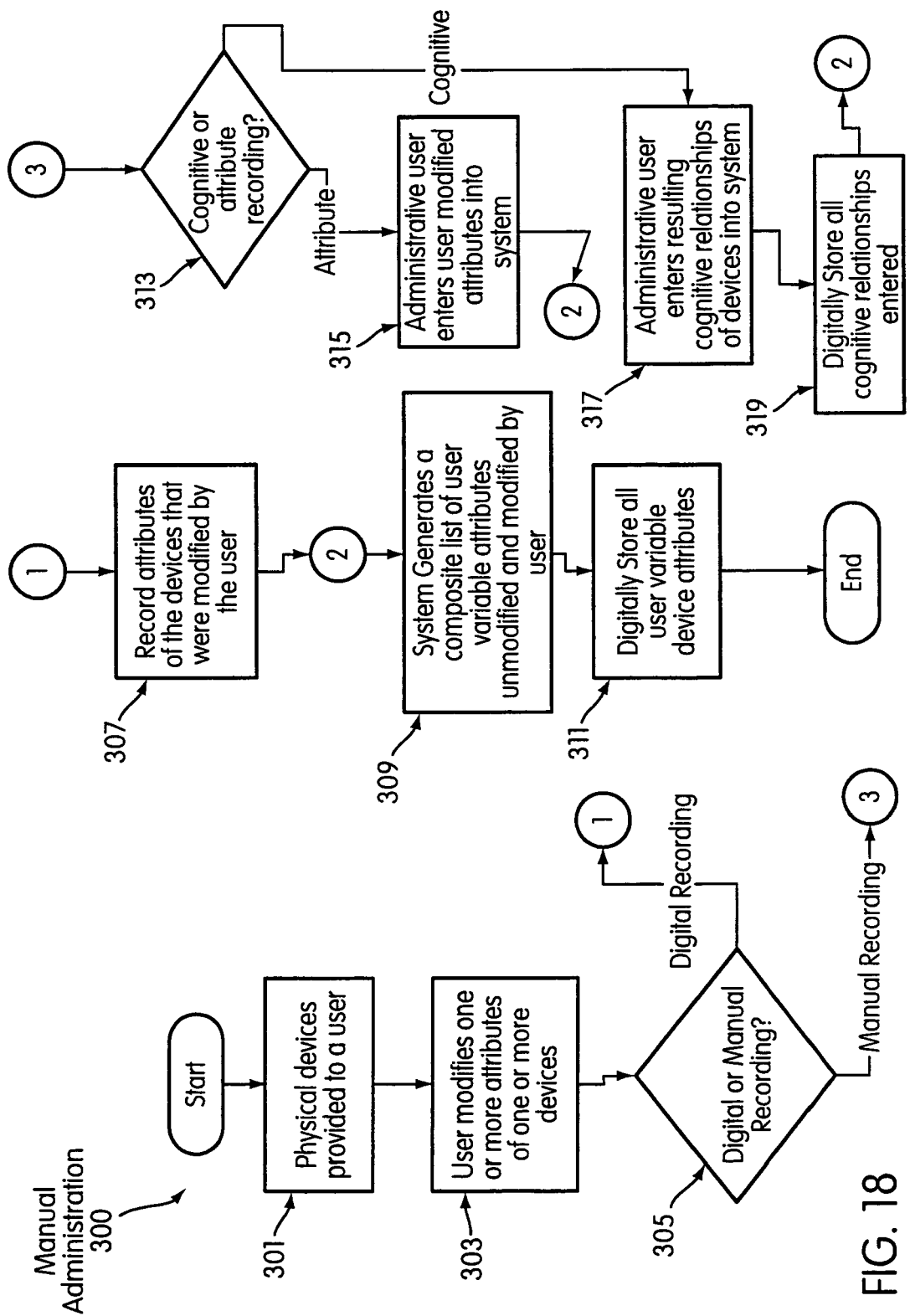
FIG. 18 is a flowchart illustrating a manual administration process according to an embodiment of the invention.

FIG. 18 illustrates a manual administration 300 from an example embodiment of a manual administration engine 1800. The process 300 begins by providing physical devices to a user (step 301). The physical devices are objects or mechanisms that can be manipulated and include things such as balls, blocks, toys, index cards, video or audio recording tape, spinners, etc. The user then, in step 303, responds to a constructed response stimulus, by modifying one or more attributes of one or more of the physical devices provided in step 301. In step 305, the user's response to the constructed item, as represented by the physical device(s) modified by the user, is recorded. At least two options for recording the response are contemplated: digital and manual recording.

For digital recording the attribute(s) of the device(s) that were modified by the user are recorded at step 307 by, for example, digital photographs, radio frequency positional locators, etc. In step 309, the system generates a composite list of modified and unmodified user variable attributes, and in step 311, the list of attributes generated in step 309 are digitally stored.

For manual recording, at step 313, the administrator can record either the user-modified device attributes (step 315) or the resulting cognitive relations of the devices following modification by the user (step 317). If attributes are recorded, the process 300 proceeds to step 309. If cognitive relationships are recorded, the relationships are digitally stored and then converted to attribute values before the process 300 proceeds to step 309.

Figure 19A:
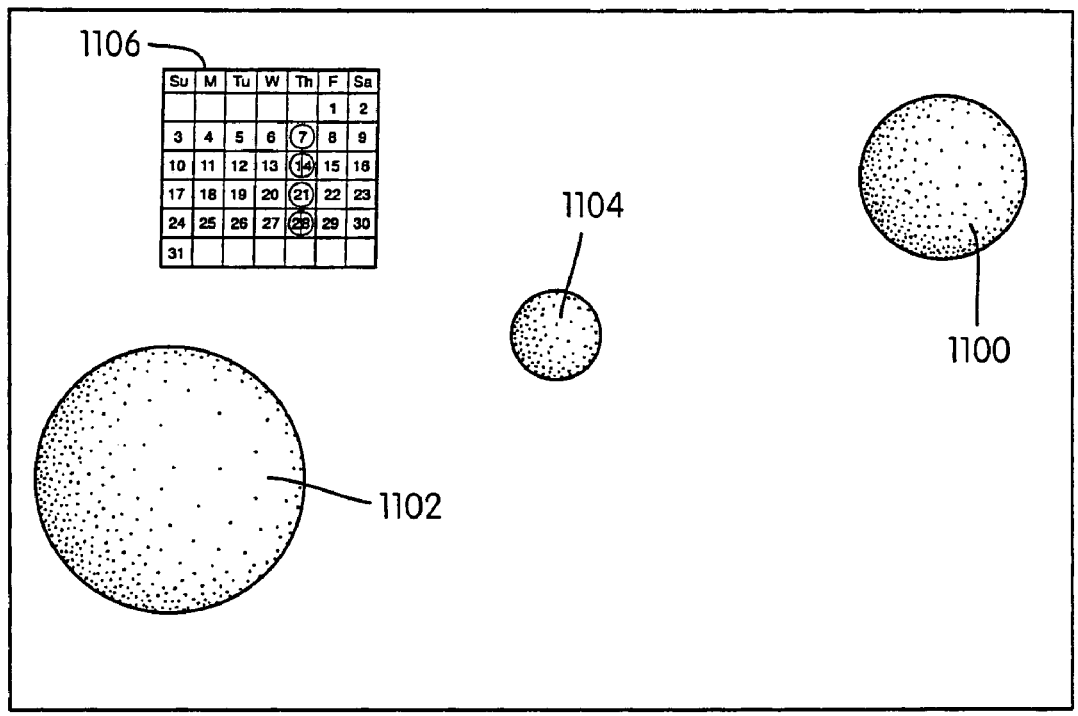
FIGS. 19a–19b illustrate a manual administration for the item design illustrated in FIG. 4 according to an embodiment of the invention.
Figure 19B:
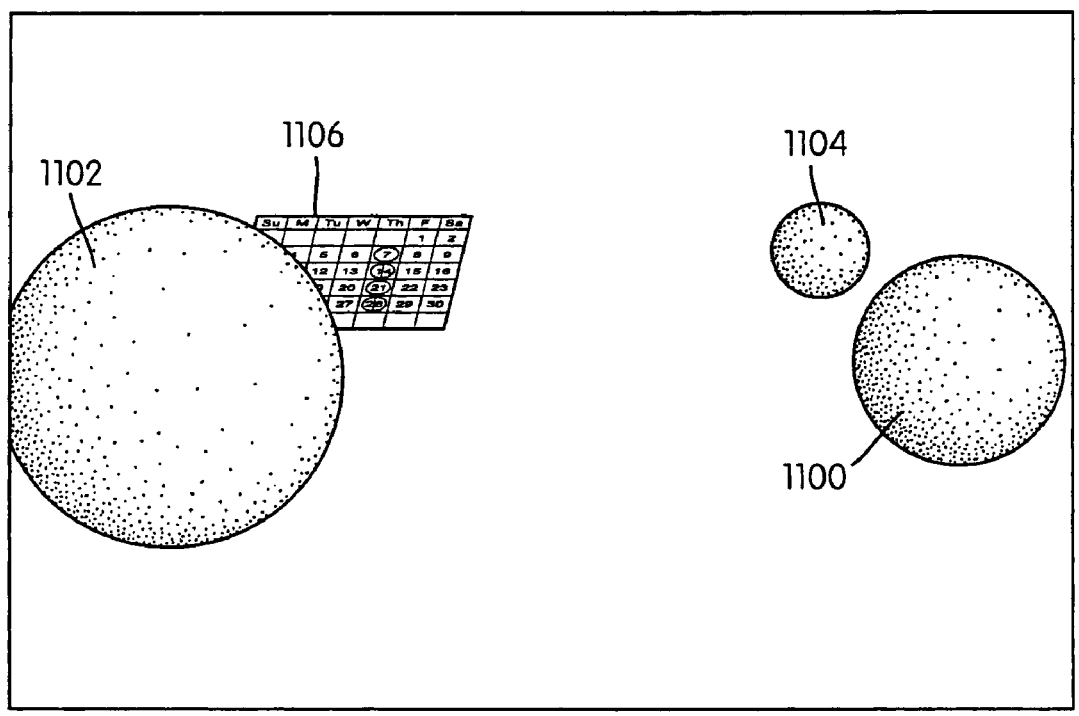
Figure 21A:
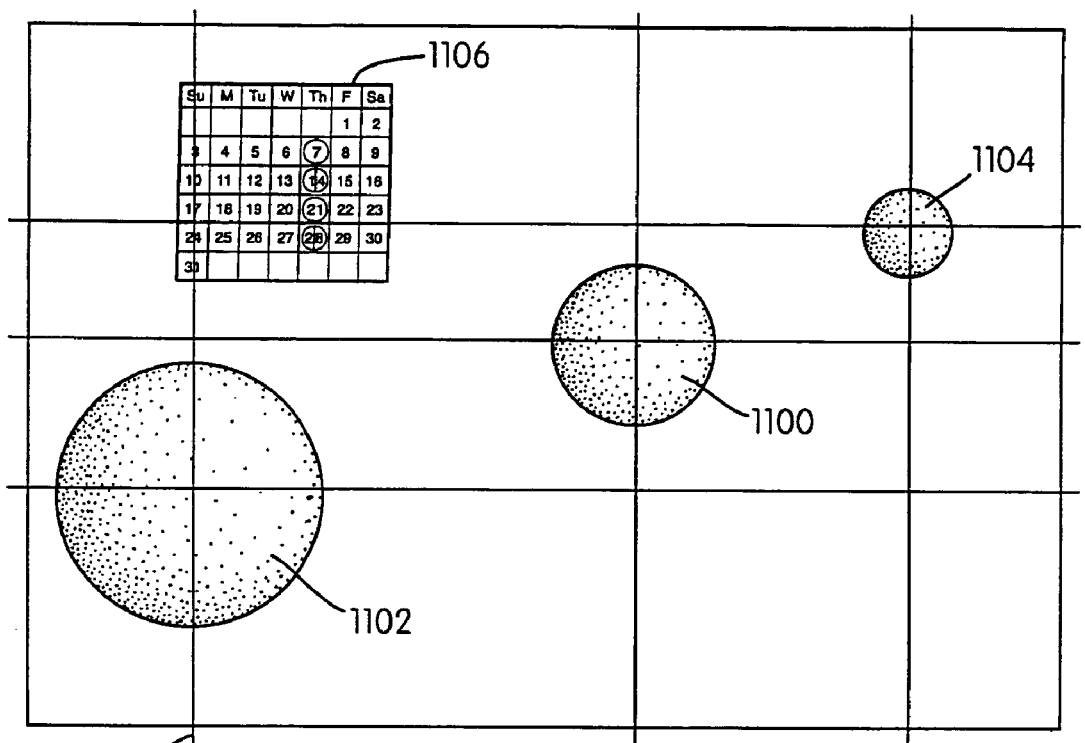
FIGS. 21a–21d illustrate dimensional data acquisition and attribute acquisition for a manual administration of the item illustrated in FIGS. 19a–19b according to an embodiment of the invention.
Figure 21B:
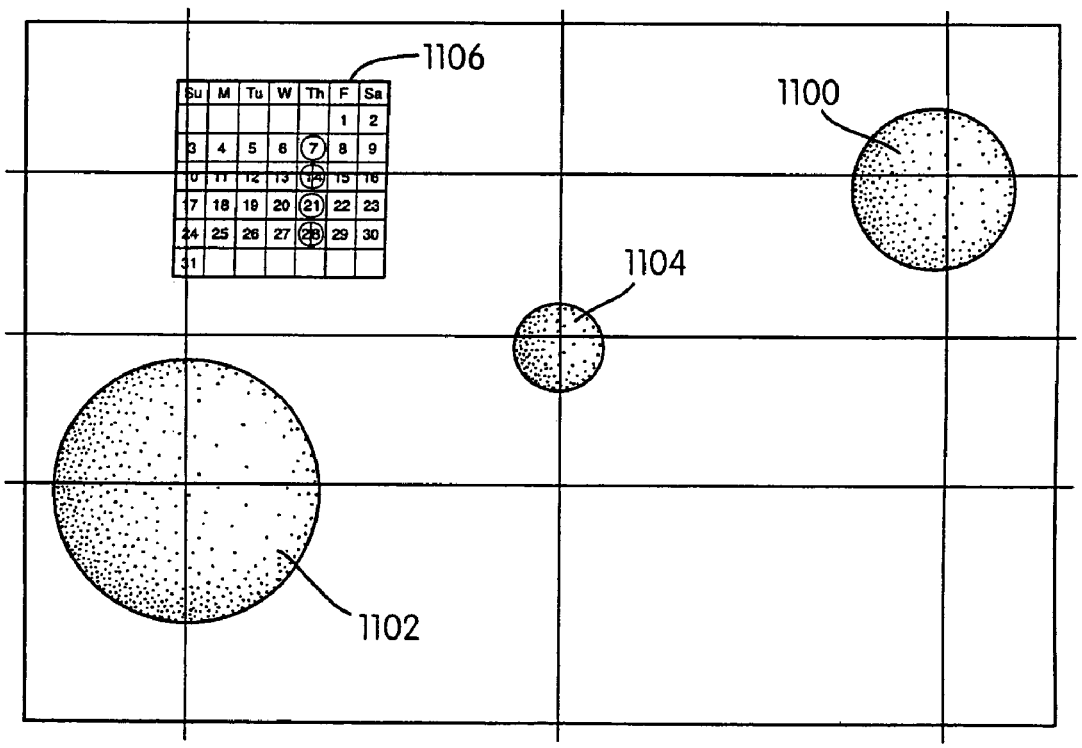
Figure 21C:
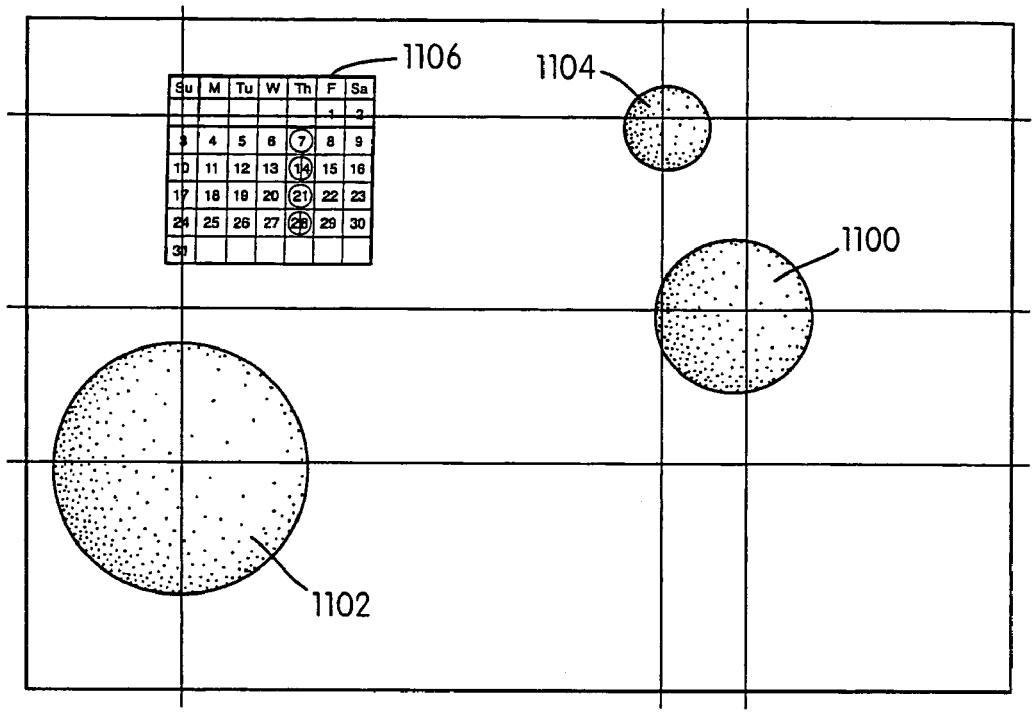
Figure 21D:
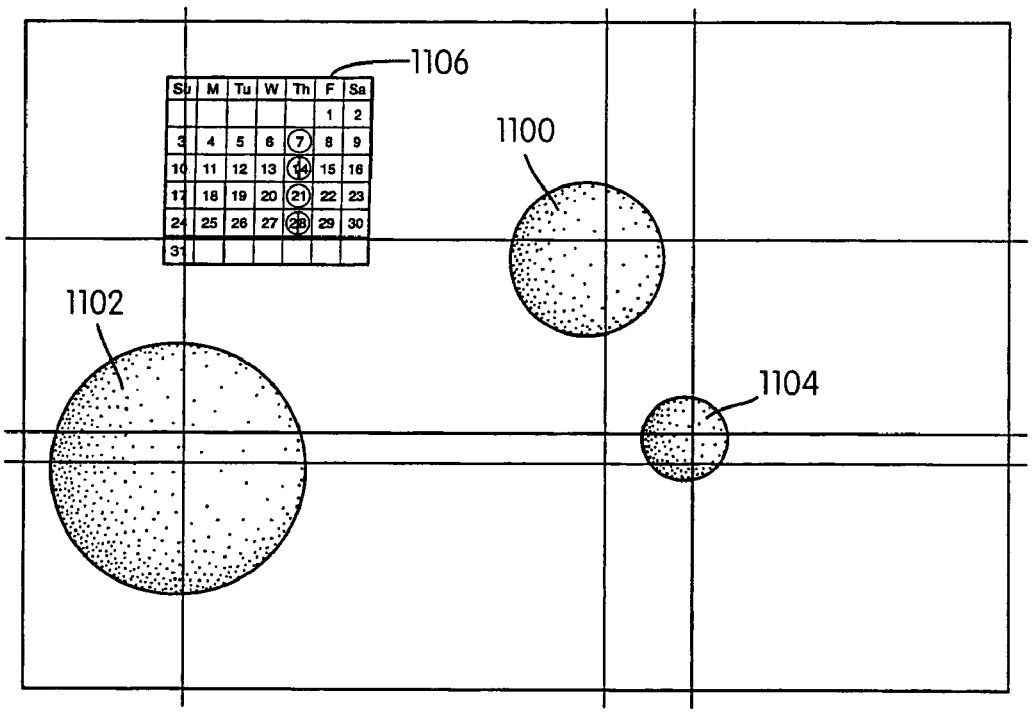

FIGS. 19a and 19b illustrate an example manual administration, which shows images of the setup for administration of an item involving Earth, Sun, and Moon concepts and respective devices (i.e., variously sized balls 1100, 1102, 1104). A document provided by setup process describer engine 1801 provides setup and procedure information to the examination proctor. The proctor asks the student to position the balls to correctly indicate the positions of the Sun, Moon and Earth on four different days of the month (associated with calendar 1106) corresponding to the phases of the Moon: Full, Half Waning, New, and Half Waxing. FIG. 19a shows the setup, and FIG. 19b shows the positions of the devices at some point during the interaction and manipulation process 1803.

FIG. 20 illustrates a digital recording process and setup of manual administration 330 in which three cameras 331, 333, 335 are used to triangulate the X, Y, Z positions of three balls 337, 339, 341 sitting on a surface 343. For 2-D triangulation, only one camera is necessary. FIGS. 21a–21d uses a single camera showing an example of one type of manual administration data acquisition of the setup and interaction and manipulation of FIGS. 19a–19b. Four photographs shown in FIGS. 21a, 21b, 21c, and 21d show the relative X, Y positions of the ball devices representing the Earth 1100, Moon 1104, and Sun 1102 concepts.

Attribute acquisition process 1807 (see FIG. 17) may be either a manual attribute acquisition process 1809, or a computer automated attribute acquisition process 1811, or both. For this example, the teacher enters the date order and uploads the photographs using a web interface. Acquisition of the photographs may be a manual process and input by scanner, or may be automated using "web cams". For this example, acquisition of the X, Y position of the balls is accomplished using a computer automated attribute acquisition process by processing the images from the manual administration data acquisition resulting in the X, Y positions for the center of each of the balls represented by axes 1209. For this example, an attribute transformation engine 1805 combines manual input from the order of the days of the month with the order of the images and the X, Y position of the balls to create position and time X, Y, T information for each of the concepts to be sent to scoring engine 2100.

The components of the manual administration engine are interconnected by link 1813, which may be an electronic communication link, a manual communication link, or a combination of the two.

Figure 22:
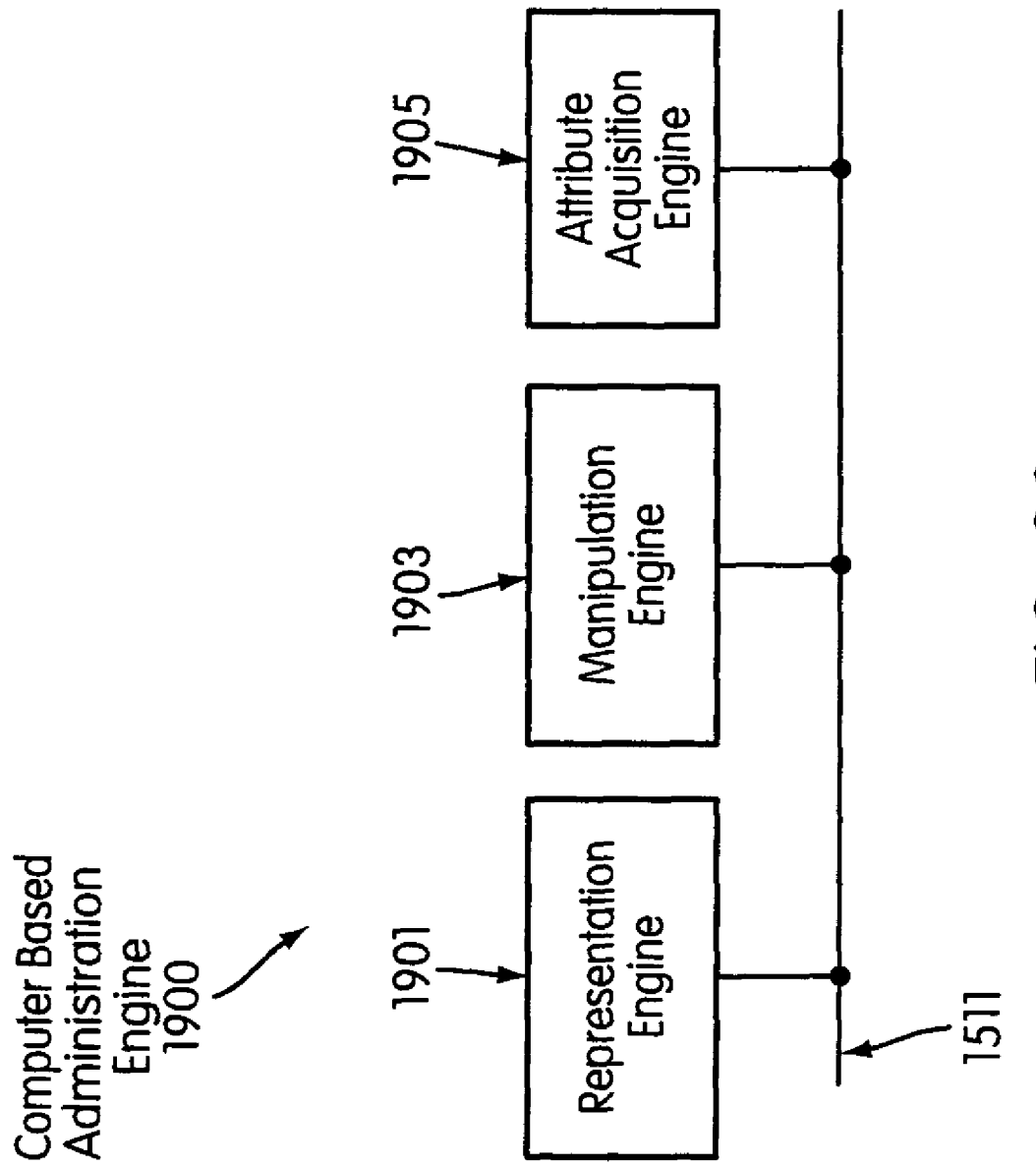
FIG. 22 illustrates a computer-based administration engine according to an embodiment of the invention.

FIG. 22 illustrates computer based administration engine 1900, according to an embodiment of the invention. Computer based administration engine 1900 comprises a representation engine 1901, which may comprise a web page, Macromedia Flash™ application, Java application, virtual reality environment, or any other software or firmware application or component that allows for digital manipulation of virtual devices that results in control over one or more computer components such as those described for output device 1605 above.

Computer based administration engine 1900 also comprises a manipulation engine 1903 which provides the student with access to devices representing concepts for manipulation of attributes of the devices. Manipulation engine 1903 may be a web page, Macromedia Flash™ application, Java application, virtual reality environment or another software or firmware application or component that allows for digital manipulation of virtual devices that allows control by one or more computer components such as those described for input devices 1603.

Computer based administration engine 1900 also comprises attribute acquisition engine 1905 which acquires the attributes of devices presented by representation engine 1901 after manipulation by the student using manipulation engine 1903. Attribute acquisition engine 1905 may be a software or firmware component that may be implemented in various programming languages such as Java, Python, Flash ActionScript, JavaScript, etc.

Figure 23:
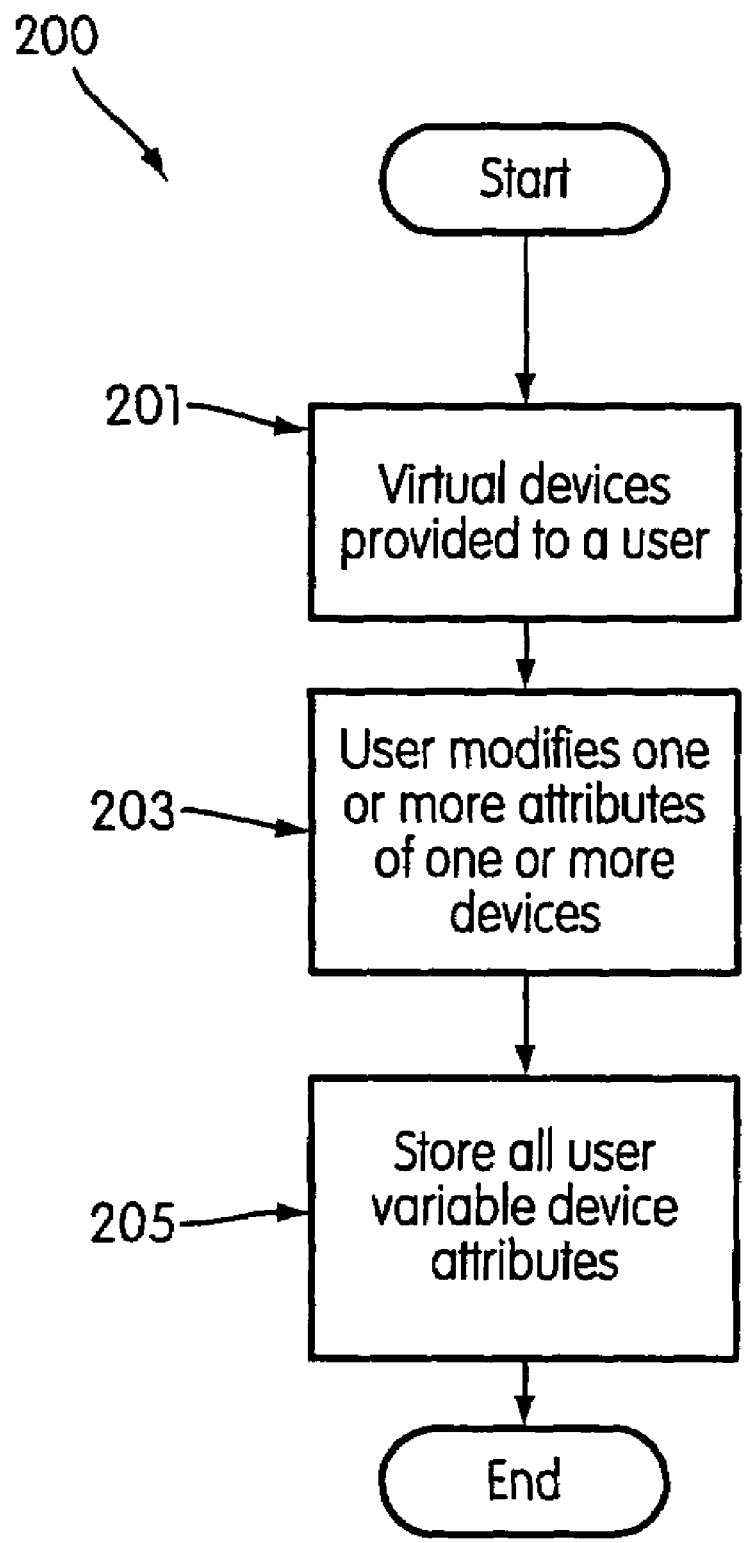
FIG. 23 is a flowchart illustrating a computer-based administration process according to an embodiment of the invention.

FIG. 23 illustrates computer based administration process 200, which is an example process of an embodiment of computer based administration engine 1900. In step 201 virtual devices are provided to a user via, for example, computer internet browser, a personal digital assistant, cell phone, telephone, or other electronic device. In step 203, the user modifies one or more attributes of the one or more virtual devices provided in step 201. In step 205 all user variable attributes of the virtual items are stored, whether or not the attributes were modified by the user.

Figure 24:
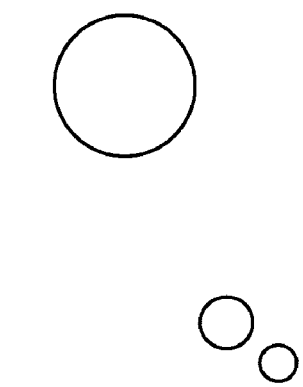
FIG. 24 illustrates a computer-based administration for the item design illustrated in FIG. 4 according to an embodiment of the invention.

FIG. 24 shows a screen capture of a computer administration of the same item design manually administered in the example of FIGS. 19a–19b and 21a–21d.

FIG. 25 shows the data acquisition for the computer based administration of FIG. 24. The data acquisition includes a template, in this case "2-D Position Modeling Template" and an item name, "Phases of the Moon Calendar Model." Data acquisition for the example shown in FIG. 25 includes the devices, sun, earth, and moon and their respective attributes, (x- position, y-position, date) for each of the four dates for which the user is required to show the relative positions of the conceptual devices (i.e., the sun, the earth, and the moon) corresponding to four different lunar phases.

Figure 26:
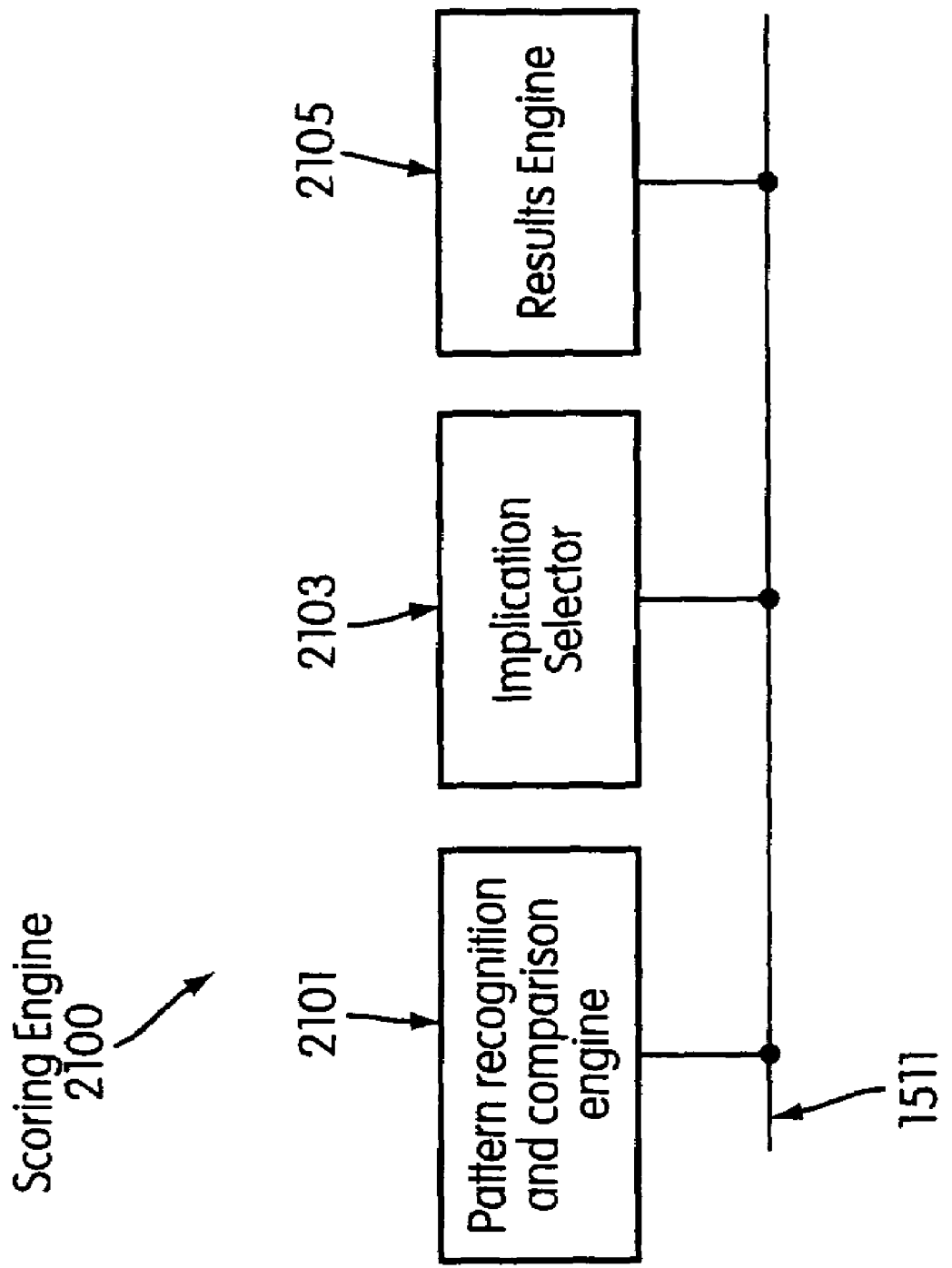
FIG. 26 illustrates a block diagram of a scoring engine according to an embodiment of the invention.

Scoring engine 2100 of FIG. 26 receives device attribute information from the administration engines 1800–1800N and/or 1900–1900N of FIG. 1 via communication system 1511 and converts the device attributes into one or more response patterns defined, not by the values of the attributes, but by the relationships between devices. Such relationships might include: next to, within, above, below, to the right (or left) of, longer (or shorter) than, larger (or smaller) than, darker (or lighter) than, etc. Scoring engine 2100 comprises a pattern recognition and comparison engine 2101 which utilizes formal definitions of relationships as shown in FIG. 13 to recognize relationships in the data that results from the administration engine and compare it to the rubric pattern(s) of this item created using rubric engine 2000–2000N. Pattern recognition and comparison engine 2101 returns a set of pattern matches between the rubric and the response. Scoring engine 2100 also comprises implication selector 2103, which allows the selection of a subset of the implications of the patterns returned by pattern recognition and comparison engine 2101. Scoring engine 2100 also comprises results engine 2105 which formats the results in the format desired by the receiving party.

Figure 27:
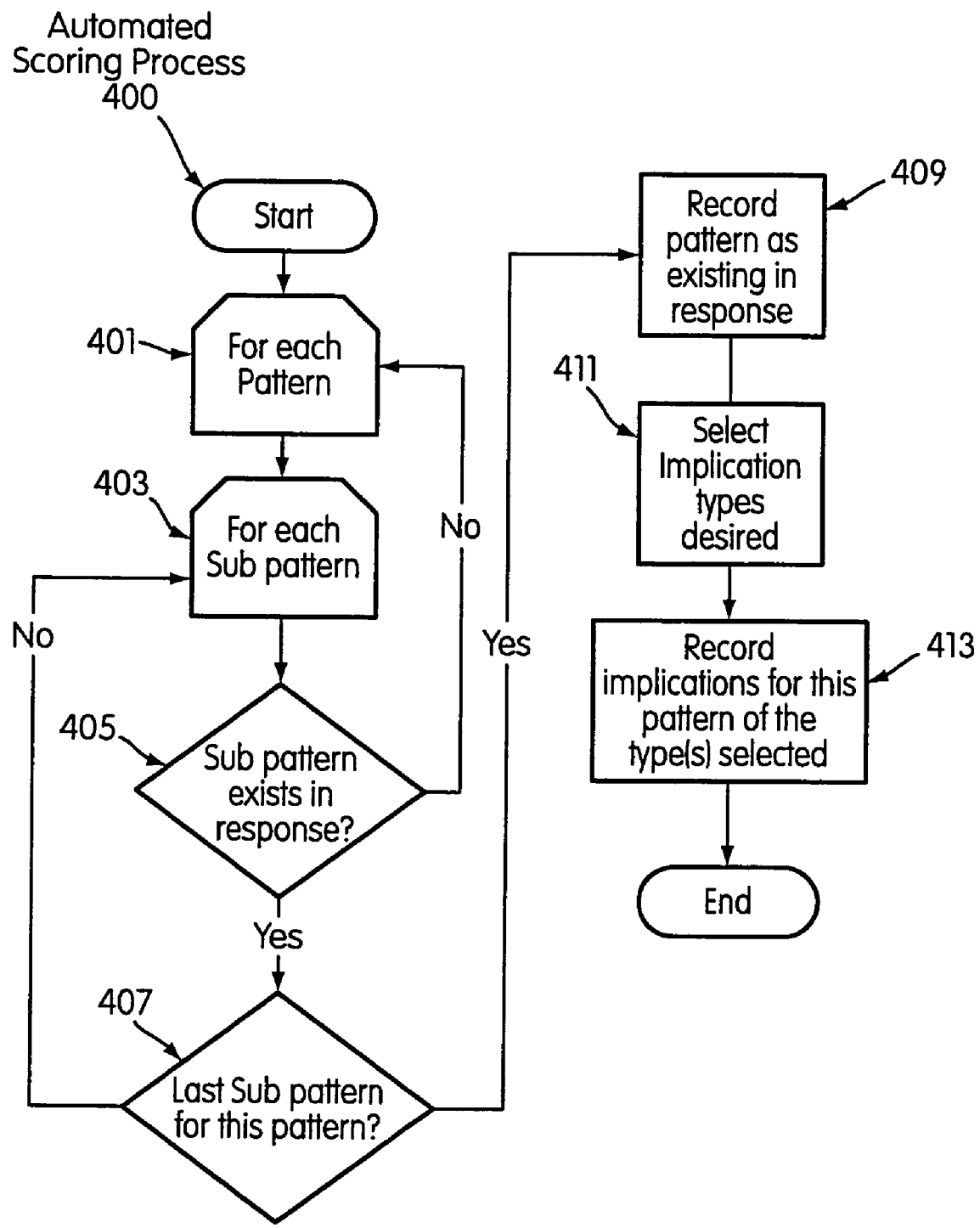
FIG. 27 is a flowchart illustrating an automated scoring process according to an embodiment of the invention.

FIG. 27 is a flowchart illustrating an automated scoring process 400 according to an embodiment of the invention. The process 400 is carried out for each pattern (step 401) and each sub-pattern (step 403) in the scoring ruberic. For each sub-pattern, the response pattern is compared to the rubric sub-pattern (step 405) to determine if the response includes the sub-pattern. If any sub-pattern of the scoring ruberic is not found in the response, the associated pattern is not found in the response, and the process 400 returns to step 401 to check the response for the next pattern of the scoring ruberic. If the sub-pattern does not exist in the response and the pattern includes additional sub-patterns (as determined at step 407), process 400 returns to step 403 to check the next sub-pattern associated with the pattern.

If all subpatterns associated with a pattern of a scoring ruberic exist in the response, the associated pattern is recorded as existing in the response at step 409. Next, the desired implication types are selected at step 411. Depending on the circumstances in which the constructed response item is used, it may be desirable to record for use only a subset of the available implication types. For example, it may be desired to record only the "raw score" implication type or the "knowledge" implication type, rather than both. At step 413, the implication type(s) selected for the pattern are recorded.

Although a preferred embodiment of the system and methodology of the present invention is specifically illustrated and described herein, it will be appreciated that modifications and variations of the present invention are covered by the above teachings and within the purview of the appended claims without departing from the spirit and intended scope of this invention.

What is claimed is:

1. A method for administering a constructed response assessment item to a respondent:
    defining a stimulus response stem requiring the respondent to demonstrate knowledge of a relationship between two or more concepts;
    providing the respondent at least one device uniquely associated with each of the two or more concepts, at least one device having at least one attribute that can be selectively manipulated by the respondent to change a relationship of that device with respect to at least one other device to construct an arrangement of devices representing a relationship between the concepts with which the devices in the arrangement are associated;
    defining a scoring rubric for the constructed response assessment item including a conceptual pattern corresponding to a relationship between the two or more concepts;
    observing the selectively manipulable attributes of the devices in the arrangement constructed by the respondent;
    converting the observed attributes into a conceptual pattern associated with the arrangement constructed by the respondent; and
    comparing the conceptual pattern of the arrangement constructed by the respondent with the conceptual pattern of the scoring rubric to determine whether or not the conceptual pattern associated with the arrangement constructed by the respondent matches the conceptual pattern of the scoring rubric.

2. The method of claim 1, wherein said rubric includes a conceptual pattern corresponding to a correct relationship between the two or more concepts.

3. The method of claim 1, wherein the devices comprise physical items that the respondent can physically manipulate and/or position with respect to each other to create a spatial arrangement of the devices demonstrating a relationship between the concepts with which the devices are associated.

4. The method of claim 1, wherein the devices comprise virtual items displayed on a computer that the respondent can electronically manipulate and/or position with respect to each other to create a virtual arrangement of the devices demonstrating a relationship between the concepts with which the devices are associated.

5. The method of claim 1, wherein the attribute of each device that can be manipulated includes one or more of size, length, height, spatial, orientation, color, direction of movement, speed of movement, sound, sound volume, texture, pattern, smell, taste, elasticity, weight, transparency, absorbency, reflectivity, shape, electrical charge, magnetism, temperature, conductivity, composition, intensity, perspective, emotion, and time.

6. The method of claim 1, further comprising defining at least one implication corresponding to each pattern of the rubric, wherein each implication comprises information relating to an outcome that occurs as the result of a pattern being found in the student response to an item.

7. A method of creating a constructed response assessment item:
    defining a stimulus response stem requiring a respondent to demonstrate knowledge of a relationship between two or more concepts;
    defining at least one device uniquely associated with each of the two or more concepts, at least one device having at least one attribute that can be selectively manipulated by the respondent to change a relationship of that device with respect to at least one other device to construct an arrangement of devices representing a relationship between the concepts with which the devices in the arrangement are associated; and
    defining a scoring rubric for the constructed response including a conceptual pattern corresponding to a relationship between the two or more concepts.

8. The method of claim 7, wherein said rubric includes a conceptual pattern corresponding to a correct relationship between the two or more concepts.

9. The method of claim 7, wherein the devices comprise physical items that the respondent can physically manipulate and/or position with respect to each other to create a spatial arrangement of the devices demonstrating a relationship between the concepts with which the devices are associated.

10. The method of claim 7, wherein the devices comprise virtual items displayed on a computer that the respondent can electronically manipulate and/or position with respect to each other to create a virtual arrangement of the devices demonstrating a relationship between the concepts with which the devices are associated.

11. The method of claim 7, wherein the attribute of each device that can be manipulated includes one or more of size, length, height, spatial, orientation, color, direction of movement, speed of movement, sound, sound volume, texture, pattern, smell, taste, elasticity, weight, transparency, absorbency, reflectivity, shape, electrical charge, magnetism, temperature, conductivity, composition, intensity, perspective, emotion, and time.

12. The method of claim 7, further comprising defining at least one implication corresponding to each pattern of the rubric, wherein each implication comprises information relating to an outcome that occurs as the result of a pattern being found in the student response to an item.

13. The method of claim 7, wherein defining at least one device comprises:
    selecting a template defining a plurality of devices and attributes of each device that can be manipulated; and
    selecting one of said devices to be uniquely associated with each of said two or more concepts.

14. A system for administering a constructed response assessment item to a respondent, said system comprising:
    a content creation engine for defining a stimulus response stem requiring the respondent to demonstrate knowledge of a relationship between two or more concepts, said content creation engine comprising:
        a concept creator constructed and arranged to allow an item designer to defined the two or more concepts;

a template selector constructed and arranged to enable the item designer to select a template defining devices with which each of the two or more concepts will be associated and attributes of the devices that can be manipulated by the respondent; and a representation linker constructed and arranged to enable the item designer to uniquely associate at least one of the devices defined by said template selector with each of the two or more concepts;

an administration engine for administering the constructed response item to the respondent, said administration engine comprising:

a representation engine constructed and arranged to present devices selected to represent the two or more concepts to a respondent;

a manipulation engine constructed and arranged to enable the respondent to manipulate attributes of the devices; and an attribute acquisition engine constructed and arranged to retrieve and record attributes of the manipulated devices;

a rubric engine for creating a rubric for evaluating a response by the respondent, said rubric engine comprising:

a pattern definer constructed and arranged to enable the item designer to define one or more rubric patterns defining device arrangements that correspond to correct and incorrect responses that are possible with the templates selected using said template selector; and an implication selector constructed and arranged to enable the designer to associate one or more implications with each of the patterns defined by said pattern definer; and a scoring engine for scoring a response created by the respondent, said scoring engine comprising:

a pattern recognition and comparison engine constructed and arranged to convert the attributes of the manipulated devices recorded by said attribute acquisition engine and to convert the attributes to a response pattern and to compare the response pattern to the one or more rubric patterns defined by said pattern definer to identify any match that may exist between the response pattern and the one or more rubric patterns;

an implication selector constructed and arranged to select at least one of the one or more implications associated with any rubric patterns which match the response pattern; and a results engine constructed and arranged to return desired response results based on the implication selected by the implication selector.

15. A system for creating a constructed response assessment item comprising:

a content creation engine for defining a stimulus response stem requiring the respondent to demonstrate knowledge of a relationship between two or more concepts, said content creation engine comprising:

a concept creator constructed and arranged to allow an item designer to defined the two or more concepts;

a template selector constructed and arranged to enable the item designer to select a template defining devices with which each of the two or more concepts will be associated and attributes of the devices that can be manipulated by the respondent; and a representation linker constructed and arranged to enable the item designer to uniquely associate at least one of the devices defined by said template selector with each of the two or more concepts; and a rubric engine for creating a rubric for evaluating a response by the respondent, said rubric engine comprising:

a pattern definer constructed and arranged to enable the item designer to define one or more rubric patterns defining device arrangements that correspond to correct and incorrect responses that are possible with the templates selected using said template selector; and an implication selector constructed and arranged to enable the designer to associate one or more implications with each of the patterns defined by said pattern definer.

16. A system for administering a constructed response assessment item to a respondent, said system comprising:

content creation means for defining a stimulus response stem requiring the respondent to demonstrate knowledge of a relationship between two or more concepts;

item administration means for administering the constructed response item to the respondent;

rubric means for creating a rubric for evaluating a response by the respondent; and scoring means for scoring a response created by the respondent.

17. A system for administering a constructed response assessment item requiring a respondent to demonstrate knowledge of a relationship between two or more concepts by manipulating attributes of devices uniquely associated with each of said two or more concepts, said system comprising:

an administration engine for administering the constructed response item to the respondent, said administration engine comprising:

a representation engine constructed and arranged to present devices selected to be uniquely associated with each of the two or more concepts to a respondent;

a manipulation engine constructed and arranged to enable the respondent to manipulate attributes of the devices; and an attribute acquisition engine constructed and arranged to retrieve and record attributes of the manipulated devices; and a scoring engine for scoring a response created by the respondent, said scoring engine comprising:

a pattern recognition and comparison engine constructed and arranged to convert the attributes of the manipulated devices recorded by said attribute acquisition engine and to convert the attributes to a response pattern and to compare the response pattern to one or more predefined rubric patterns which define device arrangements that correspond to correct and incorrect responses to identify any match that may exist between the response pattern and the one or more rubric patterns.

* * * * *